US012580632B2

(12) United States Patent
Li et al.

(10) Patent No.: US 12,580,632 B2
(45) Date of Patent: Mar. 17, 2026

(54) RECEIVING DEVICE AND TRANSMITTING DEVICE

(71) Applicant: NTT DOCOMO, INC., Tokyo (JP)

(72) Inventors: Xiang Li, Beijing (CN); Xiaolin Hou, Beijing (CN); Xin Wang, Beijing (CN); Lan Chen, Beijing (CN); Satoshi Suyama, Tokyo (JP); Tatsuki Okuyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 72 days.

(21) Appl. No.: 18/706,275

(22) PCT Filed: Nov. 24, 2021

(86) PCT No.: PCT/CN2021/132920
§ 371 (c)(1),
(2) Date: Apr. 30, 2024

(87) PCT Pub. No.: WO2023/092357
PCT Pub. Date: Jun. 1, 2023

(65) Prior Publication Data
US 2024/0421890 A1      Dec. 19, 2024

(51) Int. Cl.
*H04B 7/08*          (2006.01)
*H04B 7/06*          (2006.01)

(52) U.S. Cl.
CPC ................. *H04B 7/08* (2013.01); *H04B 7/06* (2013.01)

(58) Field of Classification Search
CPC ..................................... H04B 7/08; H04B 7/06
See application file for complete search history.

(56) References Cited

U.S. PATENT DOCUMENTS 9,113,350 B2      8/2015   Militano et al.
10,903,939 B2     1/2021   Shimezawa
(Continued)

FOREIGN PATENT DOCUMENTS

CN        106160952 A      11/2016
CN        107317614 A      11/2017
(Continued)

OTHER PUBLICATIONS

International Search Report issued in corresponding International Application No. PCT/CN2021/132920, mailed on Aug. 29, 2022 (5 pages).
(Continued)

*Primary Examiner* — Jaison Joseph
(74) *Attorney, Agent, or Firm* — Osha Bergman Watanabe & Burton LLP

(57)              ABSTRACT

Provided in the embodiments of the present disclosure are a receiving device and a transmitting device. The receiving device according to the embodiments of the present disclosure includes: a control unit, configured to determine information on intensity of a light-of-sight (LOS) channel component in a communication channel; and a sending unit, configured to send the determined information to a transmitting device. The transmitting device according to the embodiments of the present disclosure includes: a transceiving unit, which includes a first antenna array; and a control unit, configured to obtain information about the intensity of a light-of-sight (LOS) channel component in a communication channel, and to determine a configuration mode of the first antenna array according to the information.

5 Claims, 13 Drawing Sheets

Configuring Method1600

Obtaining information on Intensity of line-of-sight (LOS) channel component in communication channel      ⟩S1601

Determining configuration mode of first antenna array according to information on Intensity of LOS channel component in communication channel      ⟩S1602

(56) References Cited

U.S. PATENT DOCUMENTS

| | | | |
|---|---|---|---|
| 11,469,516 B2 * | 10/2022 | Gonzalez | H01Q 21/0025 |
| 11,509,368 B1 * | 11/2022 | Zhang | H04L 25/0204 |
| 12,146,936 B2 * | 11/2024 | Luo | G01S 5/02 |
| 2004/0057730 A1 * | 3/2004 | Littlejohn | H04B 10/1149 |
| | | | 398/156 |
| 2012/0094703 A1 | 4/2012 | Sasayama | |
| 2017/0162951 A1 * | 6/2017 | Lee | H01Q 21/29 |
| 2018/0041258 A1 | 2/2018 | Tong | |
| 2018/0097595 A1 | 4/2018 | Huang et al. | |
| 2018/0152228 A1 * | 5/2018 | Frank | H04B 7/0456 |
| 2019/0124520 A1 | 4/2019 | Tang | |
| 2019/0334591 A1 | 10/2019 | Liu et al. | |
| 2021/0152239 A1 * | 5/2021 | Guha | H01Q 3/2605 |
| 2021/0258067 A1 * | 8/2021 | Hoshino | H01Q 21/20 |
| 2022/0368025 A1 * | 11/2022 | Kim | H01Q 1/246 |
| 2023/0198134 A1 * | 6/2023 | Zhuang | G01S 7/03 |
| | | | 342/70 |
| 2024/0129023 A1 * | 4/2024 | Tashiro | H04B 7/0695 |
| 2024/0421890 A1 * | 12/2024 | Li | H04B 7/08 |
| 2025/0007573 A1 * | 1/2025 | Li | H04B 7/0413 |

FOREIGN PATENT DOCUMENTS

| | | |
|---|---|---|
| CN | 110098854 A | 8/2019 |
| KR | 20210064521 A | 6/2021 |

OTHER PUBLICATIONS

Office Action issued in U.S. Appl. No. 18/706,292, dated Jul. 30, 2025 (18 pages).

* cited by examiner

Transmitting Device                    Receiving Device

Transmitting Device                    Receiving Device

Transmitting Antenna Port                    Receiving Antenna Port

Transmitting Device 1300           Receiving Device 1200

Configuring Method1600

Information Sending Method1700

Method1800

Method1900

Method2000

Method2100

RECEIVING DEVICE AND TRANSMITTING DEVICE

CROSS-REFERENCE TO RELATED APPLICATIONS

This application is a U.S. National Phase Entry of International Application No. PCT/CN2021/132920 filed on Nov. 24, 2021, and the contents of the above-mentioned China Patent Application are hereby incorporated in its entirety as a part of the present disclosure.

TECHNICAL FIELD

The present disclosure relates to the field of wireless communication, and more particularly, to a method used in a light of sight (LOS) scenario, and a corresponding receiving device and transmitting device.

BACKGROUND

In a wireless communication system, scenarios in which a network-side device such as a base station communicates with a terminal device may generally involve LOS scenarios and non-LOS scenarios. In LOS scenarios, a signal propagated through LOS path is of a strong intensity, whereas in non-LOS scenarios, there is no LOS path or a signal propagated through LOS path is of a weak intensity.

In order to meet demands for large throughput in future wireless communication systems, it is necessary to consider using large bandwidths provided by high-frequency systems and make full use of spatial multiplexing gain of multiple-input multiple-output (MIMO) technology to improve the spectral efficiency (SE). High-frequency systems often need to rely on LOS path to guarantee intensity of signal.

In high-frequency LOS scenarios, if the antenna array is of a small size, the LOS channel can only transmit one stream of signals. Even if the number of antenna elements in the antenna array is increased, it is difficult to support the multi-stream transmission required by MIMO technology. For example, in order to improve spectrum efficiency, improvements can be based on a digital and analog hybrid beamforming (HBF) architecture in a 5G NR system. Specifically, the number of transceiving units (TxRU), antennas and the like under the HBF architecture of the 5G NR system can be increased. However, increasing the number of TXRUs or antennas will lead to an increase in hardware cost and thus in complexity, and due to the large condition number of channel(s) and the limitation of transmit power, increasing the number of TXRUs or antennas will have limited performance improvement in LOS scenarios.

SUMMARY

According to an aspect of the present disclosure, there is provided a receiving device, including: a control unit, configured to determine information on intensity of a line-of-sight (LOS) channel component in a communication channel; and a sending unit, configured to send the determined information to a transmitting device.

According to another aspect of the present disclosure, the receiving device further includes: a receiving unit, configured to receive a first reference signal from the transmitting device, in which the control unit performs channel state estimation according to the first reference signal, and determines the information about the intensity of the LOS channel component in the communication channel according to a result of the channel state estimation.

According to another aspect of the present disclosure, the sending unit is further configured to send at least one of position information and attitude information of the receiving device to the transmitting device.

According to another aspect of the present disclosure, there is provided a transmitting device, including: a transceiving unit, including a first antenna array; a control unit, configured to obtain information on the intensity of a line-of-sight (LOS) channel component in a communication channel, and to determine a configuration mode of the first antenna array according to the information.

According to another aspect of the present disclosure, the first antenna array includes a plurality of first sub-arrays.

The control unit configures the first antenna array according to at least one of position information and attitude information of the receiving device when it is determined that the communication channel satisfies a predetermined channel condition according to the information about the intensity of the line of sight (LOS) channel component in the communication channel.

According to another aspect of the present disclosure, the transceiving unit further includes a feeding module, the feeding module includes a plurality of feeding sub-modules respectively corresponding to the plurality of first sub-arrays, and the control unit configures the first antenna array through the feeding module according to at least one of position information and attitude information of the receiving device, when it is determined that the communication channel satisfies a predetermined channel condition according to the information about the intensity of the line-of-sight (LOS) channel component in the communication channel.

According to another aspect of the present disclosure, the control unit determines whether a distance between the receiving device and the transmitting device satisfies a predetermined distance condition according to the position information of the receiving device, and configures the emitting sub-arrays of the plurality of first sub-arrays.

According to another aspect of the present disclosure, the control unit configures the emitting sub-arrays of the plurality of first sub-arrays at least partially according to the position information and attitude information of the receiving device.

According to another aspect of the present disclosure, the control unit configures the beams emitted by the emitting sub-arrays of the plurality of first sub-arrays according to the position information and attitude information of the receiving device.

According to another aspect of the present disclosure, the control unit is further configured to beam shape the beams emitted by the first antenna array.

According to an aspect of the present disclosure, there is provided a receiving device, including: a transceiving unit, configured to receive a plurality of un-precoded data streams sent through a plurality of antenna ports in a transmitting device; a control unit, configured to determine an equivalent digital baseband channel matrix for the respective one of the plurality of antenna ports based on information on the intensity of a line-of-sight (LOS) channel component, and demodulate the multiple data streams according to the equivalent digital baseband channel matrix.

According to another aspect of the present disclosure, the transceiving unit is configured to send at least one of a channel state information reference signal resource indicator, a rank indicator, and a channel quality indicator to a transmitting device.

According to another aspect of the present disclosure, the control unit determines an equivalent digital baseband channel matrix for the respective one of the plurality of antenna ports according to a result of channel estimation.

According to another aspect of the present disclosure, the control unit determines an equivalent digital baseband channel matrix for the respective one of the plurality of antenna ports according to state information of the transmitting device, at least one of position information and attitude information of the receiving device, and the information about the intensity of the line-of-sight (LOS) channel component.

According to another aspect of the present disclosure, the control unit performs minimum mean square error demodulation or matched filtering demodulation on the data stream.

According to an aspect of the present disclosure, there is provided a transmitting device, including: a control unit configured to determine a plurality of un-precoded data streams for a receiving device; a transceiving unit, including a plurality of antenna ports, the respective one of which are configured to send the multiple data streams.

According to another aspect of the present disclosure, the plurality of antenna ports send the data streams using the same modulation and coding strategy and using the same transmit power.

According to an aspect of the present disclosure, there is provided a method performed by a receiving device, including: receiving a plurality of un-precoded data streams sent through a plurality of antenna ports in a transmitting device, determining an equivalent digital baseband channel matrix for the respective one of the plurality of antenna ports, and demodulating the multiple data streams according to the equivalent digital baseband channel matrix.

According to another aspect of the present disclosure, the method further includes sending at least one of a channel state information reference signal resource indicator, a rank indicator, and a channel quality indicator to a transmitting device.

According to an aspect of the present disclosure, there is provided a method performed by a transmitting device, the transmitting device including a plurality of antenna ports, the method including: determining a plurality of un-precoded data streams for a receiving device; sending the multiple data streams by using the respective one of the plurality of antenna ports.

According to an aspect of the present disclosure, there is provided a receiving device, including: a control unit, configured to determine a precoding indicator for a first antenna port of a plurality of antenna ports of a transmitting device or the receiving device; and a transceiving unit, configured to send the precoding indicator to the transmitting device.

According to another aspect of the present disclosure, the precoding indicator includes phase deflection information associated with the first antenna port.

According to another aspect of the present disclosure, the transceiving unit is further configured to send at least one of a channel state information reference signal resource indicator (CRI), a resource indicator (RI) and channel quality information (CQI) to the transmitting device.

According to another aspect of the present disclosure, the transceiving unit is configured to receive multiple data streams sent by the respective one of the plurality of antenna ports, in which the control unit is further configured to independently demodulate the multiple data streams sent by the respective antenna ports.

According to an aspect of the present disclosure, there is provided a transmitting device, including: a transceiving unit, configured to receive a precoding indicator from a receiving device, wherein the precoding indicator corresponds to a first antenna port of a plurality of antenna ports of the transmitting device or the receiving device; a control unit, configured to determine precoder information associated with the plurality of antenna ports of the transmitting device according to the precoding indicator.

According to another aspect of the present disclosure, the control unit is configured to determine the precoder information associated with the plurality of antenna ports of the transmitting device according to the precoding indicator and a DFT vector.

According to another aspect of the present disclosure, the respective antenna port of the transmitting device respectively sends to the receiving device multiple data streams precoded according to the precoding information corresponding to the antenna port.

According to another aspect of the present disclosure, the respective antenna ports of the transmitting device send multiple data streams with the same power and using the same modulation and coding scheme (MCS).

According to an aspect of the present disclosure, there is provided a method performed by a receiving device, including: determining a precoding indicator for a first antenna port of a plurality of antenna ports of a transmitting device; and sending the precoding indicator to the transmitting device.

According to an aspect of the present disclosure, there is provided a method performed by a transmitting device, including: receiving a precoding indicator from a receiving device, wherein the precoding indicator corresponds to a first antenna port of a plurality of antenna ports of the transmitting device or the receiving device; and determining precoder information associated with the plurality of antenna ports of the transmitting device according to the precoding indicator.

In the examples according to the present disclosure, whether the current scenario is an LOS scenario can be determined according to the information about the intensity of the LOS channel component in the communication channel, and in turn the transceiving unit of the transmitting device can be flexibly adjusted.

BRIEF DESCRIPTION OF DRAWINGS

The above and other objectives, features and advantages of the present disclosure will become more apparent by making more detailed descriptions of the embodiments of the present disclosure in conjunction with the accompanying drawings. The accompanying drawings are used to provide a further understanding of the embodiments of the present disclosure and constitute a part of the specification, and together with the embodiments of the present disclosure, serve to explain the present disclosure, and do not constitute a limitation to the present disclosure. In the accompanying drawings, like reference numerals generally represent like parts or steps.

DETAILED DESCRIPTION

Figure 1:
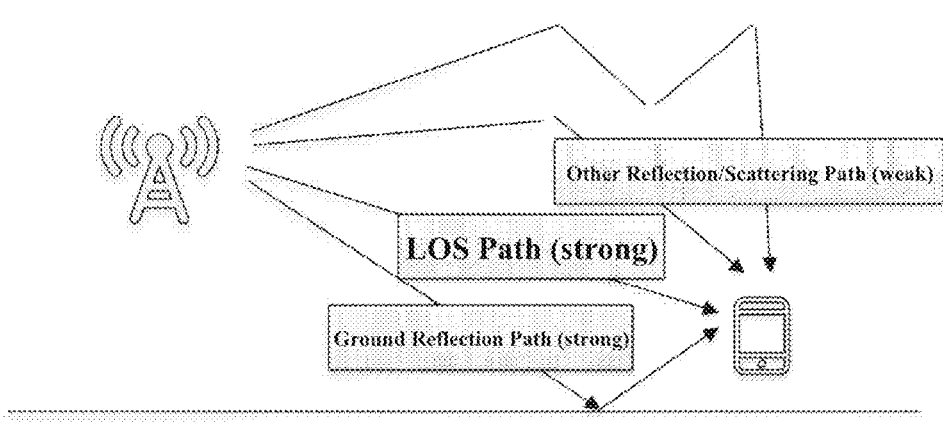
FIG. 1 is a schematic diagram showing an example situation in which transmission is performed using a high-frequency band.

In order to make the objectives, technical solutions and advantages of the present disclosure more obvious, exemplary embodiments according to the present disclosure will be described in detail below with reference to the accompanying drawings. In the accompanying drawings, like reference numerals refer to like elements throughout. It should be understood that the embodiments described herein are merely illustrative and should not be construed as limiting the scope of the present disclosure.

The transmitting device described in the present disclosure can be a base station or it can include a base station and a relay device for forwarding signals sent by the base station. In addition, the receiving device described in the present disclosure can be a terminal or it can include a terminal and a relay device for forwarding signals to the terminal, and vice versa. In the following embodiments of the present disclosure, a description will be made mainly with examples in which a transmitting device includes a base station and a receiving device includes a terminal. However, it should be understood that such examples can be applied to other variations of the transmitting device and the receiving device.

The terminals described in the present disclosure may include various types of terminals, such as vehicle terminals, User Equipment (UE), mobile terminals (or referred to as mobile stations) or fixed terminals or the like. The base station (BS) described in the present disclosure may include various types of base stations, such as wireless base stations, fixed stations, NodeB, eNodeB (eNB), gNodeB (gNB), access point, a transmission point (TP), reception point (RP), transmission/reception point (TRP), or the like.

In order to meet demands for large throughput in future communication systems, it is necessary to consider using large bandwidths provided by high-frequency bands. For example, it is necessary to consider using the sub-Terahertz spectrum above 100 GHz. Moreover, high-frequency systems often rely on LOS transmission to guarantee the intensity of received signals. FIG. 1 is a schematic diagram showing an example situation in which LOS transmission is performed using a high-frequency band. As shown in FIG. 1, when LOS transmission is performed using a high-frequency band, there are a strong LOS path and a strong ground reflection path, whereas other reflection paths or scattering paths are weak.

On the other hand, in order to meet demands for large throughputs in future communication systems, it is also desired to make full use of MIMO spatial multiplexing gain to improve the SE. As shown in FIG. 1, it is difficult to support multi-stream transmission since there are only a strong LOS path and a strong ground reflection path in a high-frequency band and the channel condition number is large.

Figure 2:
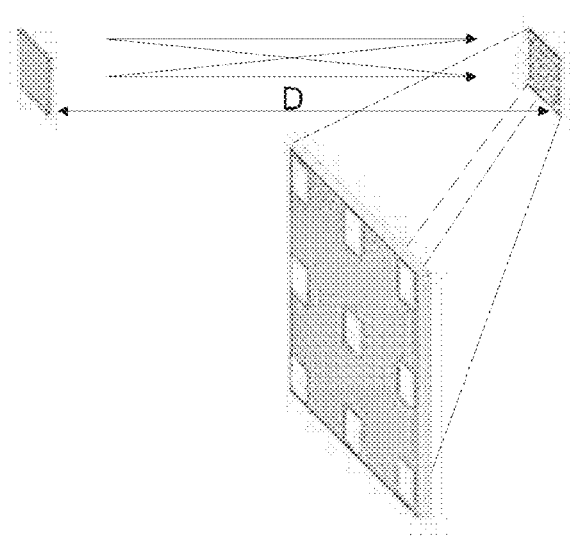
FIG. 2 is a schematic diagram showing an example situation in which transmission is performed by a large-spacing array antenna.

Therefore, it is proposed to improve channel conditions by improving antenna arrangement. For example, rank of LOS channel may be increased by increasing the distances between respective one of a plurality of array antennas of the receiving and transmitting devices, so that multi-stream transmission can be performed between multiple pairs of receiving and transmitting antenna arrays. FIG. 2 is a schematic diagram showing an example situation in which transmission is performed by a large-spacing array antenna. In the example shown in FIG. 2, for simplicity, a description is provided with the array antenna arrangement of the receiving device as an example, and it should be understood that an array antenna arrangement similar to that of the receiving device is also required at the transmitting device. As shown in FIG. 2, gray area 210 is an area in which a plurality of array antennas of the receiving device are located, and each of the white squares in the gray area 210 is a receiving array antenna. The distances between the respective white squares are increased to be much larger than the half wavelength of the beam used by the communication system, so that the rank of LOS channel is increased or the condition number of LOS channel is reduced, so as to perform multi-stream transmission between multiple pairs of transmitting and receiving antenna arrays.

Specifically, taking a uniform linear array as an example, an optimal distance between the respective adjacent transmitting and receiving antennas can be determined according to Formula 1 below:

$$d_T \cdot d_R = \frac{\lambda D}{N} \qquad (1)$$

where $d_T$ is the distance between adjacent receiving array antennas in the transmitting device, $d_R$ is the distance between adjacent receiving array antennas in the receiving device, $\lambda$ is the wavelength of the carrier used by the communication system, D is the distance between the transmitting device and the receiving device, and N is the number of transmitting and receiving antenna pairs. For a uniform planar array, the optimal distance between adjacent transmitting and receiving antennas in each dimension can be determined according to Formula 1.

As shown in Formula 1, the optimal distance between transmitting or receiving array antennas is related to the distance between the transmitting device and the receiving device. However, when the optimal distance between the transmitting or receiving array antennas shown in Formula 1 cannot be satisfied, the performance drops significantly and it is difficult to achieve the expected gain.

On the other hand, in the current communication system, the antennas are arranged in advance in the transmitting device in a traditional way, or the antennas are configured in a way that improves LOS scenarios. The transmitting device cannot flexibly adjust the transmitting device according to whether the current scenario is a LOS scenario.

Figure 3:
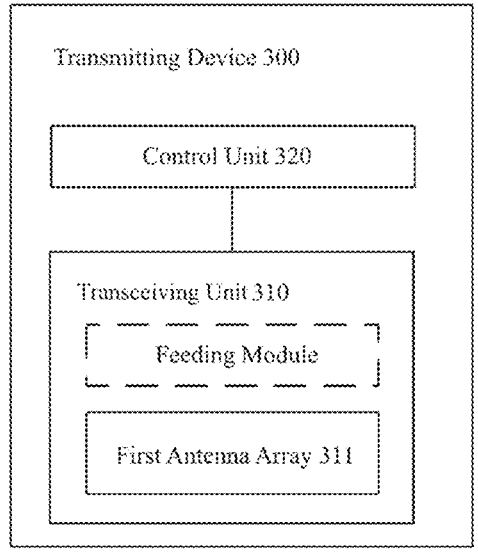
FIG. 3 is a schematic block diagram showing a transmitting device according to an embodiment of the present disclosure.

Firstly, a transmitting device in which the embodiments of the present disclosure can be applied will be described with reference to FIGS. 3 to 6. FIG. 3 is a schematic block diagram showing a transmitting device according to an embodiment of the present disclosure. As shown in FIG. 3, the transmitting device 300 may include a transceiving unit 310 and a control unit 320. Specifically, the transceiving unit 310 may include a first antenna array 311. For example, the first antenna array may be a reconfigurable intelligent surface (RIS). For another example, the first antenna array may be a phased array antenna (PAA). For yet another example, the first antenna array may be a lens array antenna. Optionally, the first antenna array may be divided into a plurality of first sub-arrays. Each first sub-array may include one or more array elements. As described above, according to an example of the present disclosure, the transmitting device 300 may be a base station, and the first antenna array 311 may be a component included in the base station. Alternatively, the first antenna array 311 may be provided independently of the base station. Further, the transmitting device 300 may be a terminal device, and the first antenna array 311 may be a component included in the terminal. Alternatively, the first antenna array 311 may be provided independently of the terminal device.

The transmitting device 300 may also include other components, however, since these components have nothing to do with the contents of the embodiment of the present disclosure, their illustrations and descriptions are omitted here.

In the embodiments according to the present disclosure, the transmitting device may flexibly adjust the first antenna array in the transceiving unit according to the current communication scenario, to improve the performance of the communication system. Specifically, the control unit 320 may obtain information on the intensity of a line-of-sight (LOS) channel component in a communication channel. For example, the information about the intensity of the LOS channel component may be a Rician K-factor, hereinafter referred to as "K-factor" for short, which represents a ratio of the intensity of the LOS channel component to the intensity of the non-LOS channel component. In addition, the information about the intensity of the LOS channel component may also be other information indicating whether the LOS path exists or is relatively strong or weak.

In an example according to the present disclosure, the intensity of the LOS channel component in the communication channel may be estimated by the transmitting device 300, to obtain the information about the intensity of the LOS channel component. The intensity of the LOS channel component in the communication channel may also be estimated by the receiving device that is to communicate with the transmitting device 300, and the information about the intensity of the LOS channel component may be sent to the transmitting device 300. For example, the transmitting device 300 may receive a reference signal from the receiving device through the transceiving unit 310, and the control unit 320 may estimate the intensity of the LOS channel component in the communication channel according to this uplink reference signal. Alternatively, the transmitting device 300 may send a reference signal to the UE through the transceiving unit 310. The receiving device may estimate the intensity of the LOS channel component in the communication channel according to this downlink reference signal, and send information about the estimated intensity of the LOS channel component to the transmitting device 300, to decrease the operations required by the transmitting device, guaranteeing the quality of communication.

Then, the control unit 320 may determine a configuration mode of the first antenna array 311 according to the said information. According to an example of the present disclosure, when it is determined that the communication channel satisfies a predetermined channel condition according to the information about the intensity of the line-of-sight (LOS) channel component in the communication channel, the control unit 320 may determine that the current communication scenario is an LOS scenario and configure the first antenna array 311 to be suitable for communication in the LOS scenario. For example, when the K factor is greater than or equal to a predetermined value, the control unit 320 may determine that the current communication scenario is a LOS scenario. In this case, the control unit 320 may configure the first antenna array 311 to be suitable for communication in the LOS scenario. Therefore, the transmitting device according to the embodiment of the present disclosure can determine whether the current scenario is an LOS scenario according to the information about the intensity of the LOS channel component in the communication channel, and then flexibly adjust the first antenna array in the transceiving unit.

According to an example of the present disclosure, when it is determined that the communication channel satisfies the predetermined channel condition according to the information about the intensity of the LOS channel component in the communication channel, the control unit 320 may configure the first antenna array 311 according to at least one of position information and attitude information of the receiving device. As described above, as an example, the first antenna array 311 may include a plurality of first sub-arrays. When it is determined that the communication channel satisfies the predetermined channel condition according to the information about the intensity of the line-of-sight (LOS) channel component in the communication channel, the control unit 320 may configure the emitting sub-arrays of the plurality of first sub-arrays according to at least one of position information and attitude information of the receiving device. For example, the control unit 320 may configure the distance between adjacent emitting sub-arrays according to at least one of position information and attitude information of the receiving device. For another example, the control unit 320 may configure the beams emitted by the emitting sub-arrays according to at least one of position information and attitude information of the receiving device.

In addition, in another example of the present disclosure, the transceiving unit 310 may further include a feeding module for feeding the first antenna array 311 (as shown by the dotted line in FIG. 3). The feeding module may include a plurality of feeding modules respectively corresponding to the plurality of first sub-arrays. When it is determined that the communication channel satisfies the predetermined channel condition according to the information about the intensity of the LOS channel component in the communication channel, the control unit 320 may configure the first antenna array through the feeding module according to at least one of position information and attitude information of the receiving device.

In an example according to the present disclosure, the feeding module may feed the first antenna array in a wireless manner or in a wired manner. For example, the feeding module may include a driving component and a second antenna array, and the second antenna array is driven by the driving component to emit a beam to the first antenna array, thereby feeding the first antenna array. For another example, the feeding module may include a driving component and directly feed the first antenna array through the driving component.

Figure 4A:
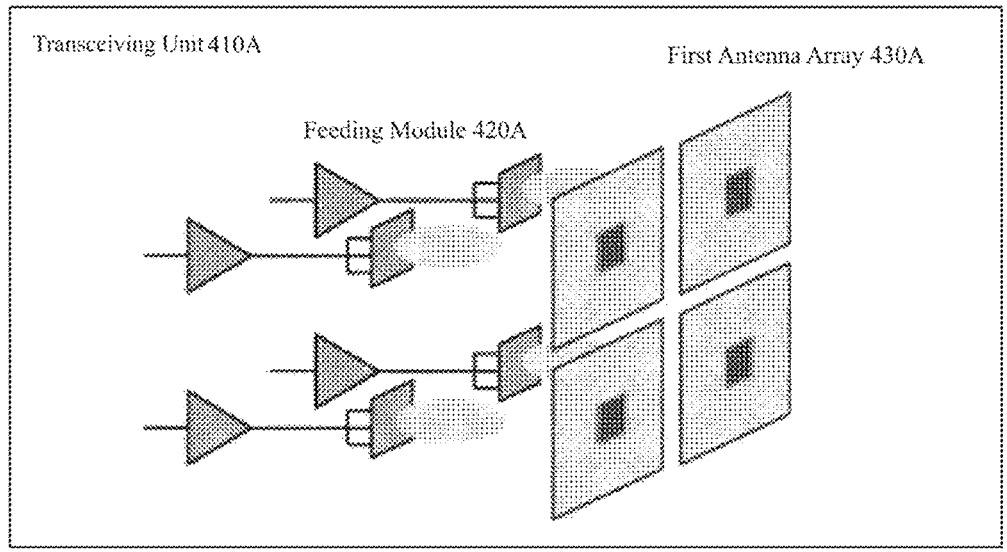
FIGS. 4A-4D are schematic diagrams showing a transceiving unit of a transmitting device according to an embodiment of the present disclosure.

FIGS. 4A-4D are schematic diagrams showing a transceiving unit of a transmitting device according to an embodiment of the present disclosure. FIG. 4A is a schematic diagram showing a transceiving unit of a transmitting device according to an embodiment of the present disclosure. In the example shown in FIG. 4A, the transceiving unit 410A of the transmitting device includes a feeding module 420A and a first antenna array 430A, in which the feeding module 420A includes driving components (as shown by the triangles in the feeding module 420A in FIG. 4A) and second antenna arrays (as shown by the squares in the feeding module 420A in FIG. 4A). For example, the second antenna array may be a phased array antenna (PAA) or a lens array antenna. The first antenna array 430A is a RIS equipment or a lens array antenna corresponding to the feeding module 420A. As shown in FIG. 4A, the first antenna array 430A is divided into 4 first sub-arrays, and the second antenna array includes second sub-arrays corresponding to the 4 first sub-arrays, and the driving components are connected to the respective second sub-arrays.

In the example shown in FIG. 4A, a second sub-array connected with a driving component is driven by the driving component to emit a second beam to be projected onto a corresponding first sub-array. The black area in the first antenna array 430A of FIG. 4A schematically shows the light spot formed by the second beam main lobe on the first sub-array. For example, the projecting position of the second beam onto the corresponding first sub-array may be adjusted by beamforming the second beam emitted by the second sub-array. The first sub-array may reflect or transmit the second beam projected onto the sub-array, to emit a first beam.

In an embodiment according to the present disclosure, an array composed of array elements in the first sub-array for emitting the first beam may be referred to as an emitting sub-array. For example, in the example shown in FIG. 4A, in each of the first sub-arrays, the array elements in the area shown by the black square constitute an emitting sub-array. Each of the emitting sub-arrays may emit a first beam.

Figure 4B:
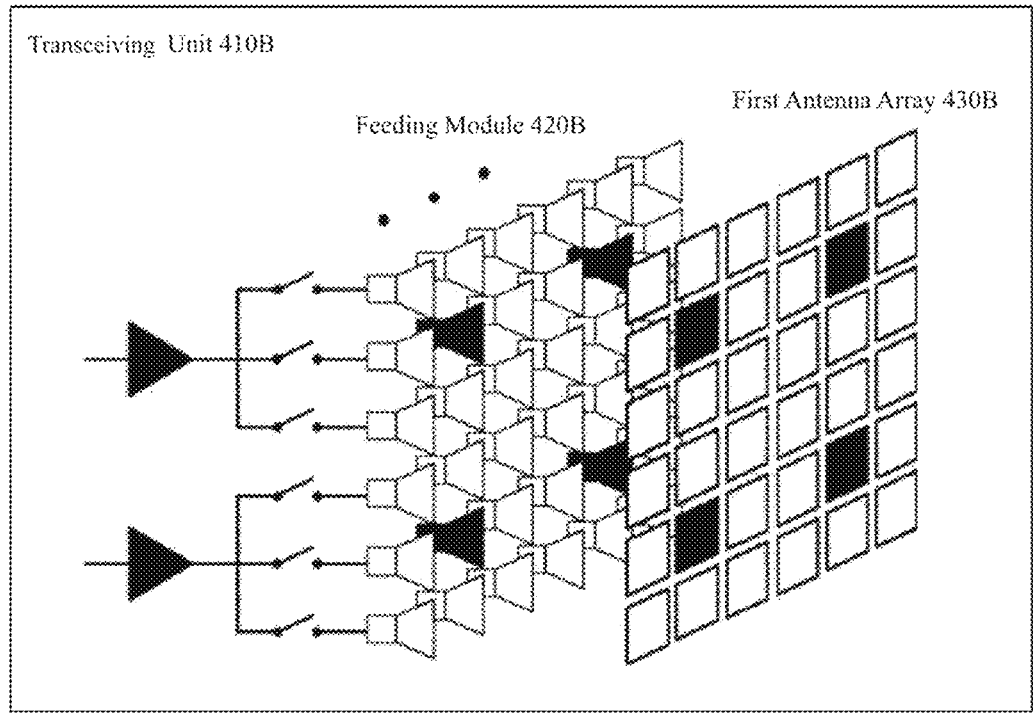

In the example shown in FIG. 4A, a description is provided with examples in which the second antenna array may be an antenna array capable of beamforming such as PAA or lens array antenna. Alternatively, the second antenna array may be a directional antenna. FIG. 4B is a schematic diagram showing a transceiving unit of a transmitting device according to another embodiment of the present disclosure. In the example shown in FIG. 4B, the transceiving unit 410B of the transmitting device includes a feeding module 420B and a first antenna array 430B, in which the feeding module 420B includes driving components (as shown by the triangles in the feeding module 420B in FIG. 4B) and second antenna arrays (as shown by the horns in the feeding module 420B in FIG. 4B). In FIG. 4B, the second antenna array may be a directional antenna array. The first antenna array 430B may be an RIS equipment or a lens array antenna corresponding to the feeding module 420B. Since it is difficult for a directional antenna to change the direction of the beam it emits by beamforming, the number of second sub-arrays included in the second antenna array composed of directional antennas is more than that in the case where the second antenna array is an antenna array capable of beamforming. In addition, the first antenna array 430B may be divided into more first sub-arrays so as to correspond to the second sub-arrays. As shown in FIG. 4B, the second antenna array includes second sub-arrays respectively corresponding to the plurality of first sub-arrays, and the driving components are respectively connected with the respective second sub-arrays. In FIG. 4B, each horn identifier represents a second sub-array, and each second sub-array may include one or more directional antennas.

Similar to FIG. 4A, in the example shown in FIG. 4B, a second sub-array connected with a driving component is driven by the driving component to emit a second beam to be projected onto a corresponding first sub-array. The black area in the first antenna array 430B of FIG. 4B schematically shows that the main lobe of the second beam is located on the first sub-array thereon. The corresponding first sub-array may be selected by driving different second sub-arrays. In the example shown in FIG. 4B, the first sub-array corresponding to the second sub-array emitting the second beam is referred to as the emitting sub-array. Each emitting sub-array may emit a first beam.

Figure 4C:
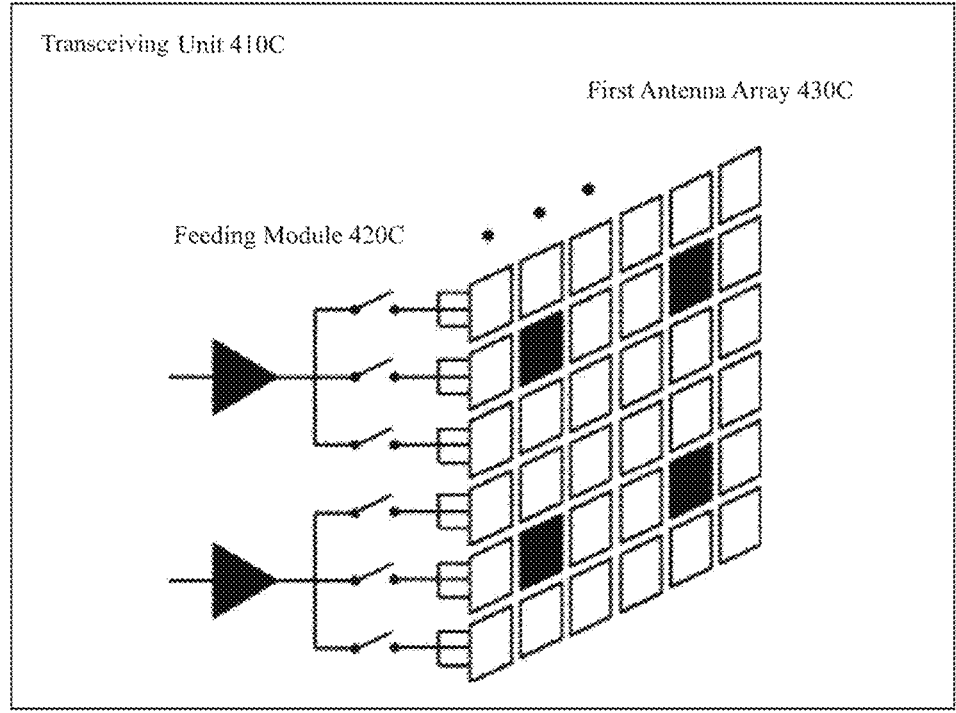

As above, the situation in which a first antenna array is driven in a wireless feeding manner has been exemplarily described with reference to FIGS. 4A and 4B. Alternatively, the first antenna array may also be driven in a wired feeding manner. FIG. 4C is a schematic diagram showing a transceiving unit of a transmitting device according to another embodiment of the present disclosure. In the example shown in FIG. 4C, the transceiving unit 410C of the transmitting device includes a feeding module 420C, in which the feeding module 420C includes driving components (as shown by the triangles in the feeding module 420C in FIG.

4C). The first antenna array 430C is an antenna array corresponding to the feeding module 420C, such as PAA. Since wired feeding cannot change the direction of the beam it emits by beamforming, the first antenna array 430C may be divided into more first sub-arrays in a wired feeding situation, compared to the case where the transceiving unit includes the second antenna arrays that are antenna arrays capable of beamforming. As shown in FIG. 4C, the driving components are respectively connected with the respective first sub-arrays, to directly control which first sub-array to be fed. The first sub-array driven by the driving component (as shown by the black area in the first antenna array 430C in FIG. 4C) may be referred to as an emitting sub-array. Each emitting sub-array may emit a first beam.

Figure 4D:
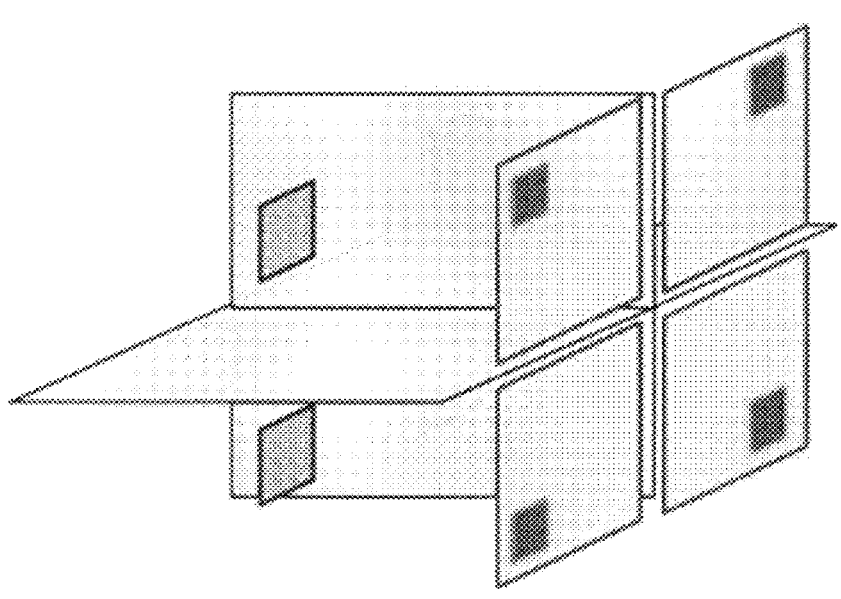

Furthermore, in the above example, isolation may be physically performed between the first sub-arrays. FIG. 4D is a schematic diagram showing physical isolation being physically performed between the first sub-arrays according to an example of the present disclosure. As shown in FIG. 4D, the degree of isolation between the first sub-arrays may be increased to further suppress the interference. For example, a filter material such as a frequency selective surface (FSS) may be used. Alternatively, the first antenna array may be logically divided to obtain a plurality of first sub-arrays, rather than physically performing isolation between the first sub-arrays. For example, when interference can be relatively well suppressed by beamforming, physical isolation may not be used.

According to an example of the present disclosure, the control unit 320 may determine whether the distance between the receiving device and the transmitting device 300 satisfies a predetermined distance condition according to the position information of the receiving device, and configure the emitting sub-arrays of a plurality of first sub-arrays. For example, when the control unit 320 determines that the distance between the receiving device and the transmitting device 300 is less than or equal to the predetermined distance condition according to the position information of the receiving device, a predetermined sub-array or a predetermined part of the plurality of first sub-arrays may be used as an emitting sub-array. Therefore, even if detailed position information or attitude information about the receiving device is not used, the emitting sub-array can be simply configured at the transmitting device to be suitable for LOS communication scenarios.

Figure 5:
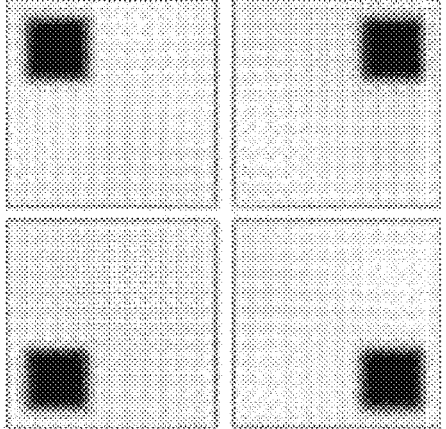
FIG. 5 is a schematic diagram showing an emitting sub-array configured in the transceiving unit shown in FIG. 4A when the control unit determines that the distance between a receiving device and a transmitting device is less than or equal to a predetermined distance condition.

FIG. 5 is a schematic diagram showing an emitting sub-array configured in the transceiving unit shown in FIG. 4A when the control unit determines that the distance between the receiving device and the transmitting device is less than or equal to a predetermined distance condition. In the example shown in FIG. 5, the corners near the adjacent sub-arrays in the respective first sub-arrays are referred to as inner corners, and the corners far from the adjacent sub-arrays are referred to as outer corners. As shown in FIG. 5, when the control unit determines that the distance between the receiving device and the transmitting device 300 is greater than or equal to the predetermined distance condition, the respective second sub-arrays may be driven by the driving component to emit a beam toward the outer corner of the first sub-array corresponding to the second sub-array, to form light spots at the outer corners of the respective first sub-arrays (as shown by the black area in the respective first sub-arrays in FIG. 5). In each of the first sub-arrays, the array elements in the areas shown by the black squares form an emitting sub-array, to emit a first beam. Thus the distance between the plurality of emitting sub-arrays is large.

According to another example of the present disclosure, the control unit 320 may configure the emitting sub-arrays of the plurality of first sub-arrays at least partially according to the position information and attitude information of the receiving device. For example, the control unit 320 may determine which parts or which sub-arrays of the plurality of first sub-arrays are used as the emitting sub-arrays based at least in part on the position information and attitude information of the receiving device. Therefore, the emitting sub-arrays can be accurately configured at the transmitting device according to the specific terminal to be suitable for LOS communication scenarios, improving the performance of a system.

For example, the position information of the receiving device may be the three-dimensional coordinates of the receiving device relative to a reference point in the transmitting device. The position information of the receiving device may include one or more of distance between the receiving device and the transmitting device, information on a downlink angle of departure (DL-AoD), and information on an uplink angle of arrival (UL-AoA). For another example, the attitude information of the receiving device may be the deflection angles of the receiving device relative to the coordinate axes in the horizontal, vertical, and depth directions. The attitude information of the receiving device may include one or more of information about a downlink angle of arrival (DL-AoA) and information about the receiving inclination angle of the receiving device.

Figure 6:
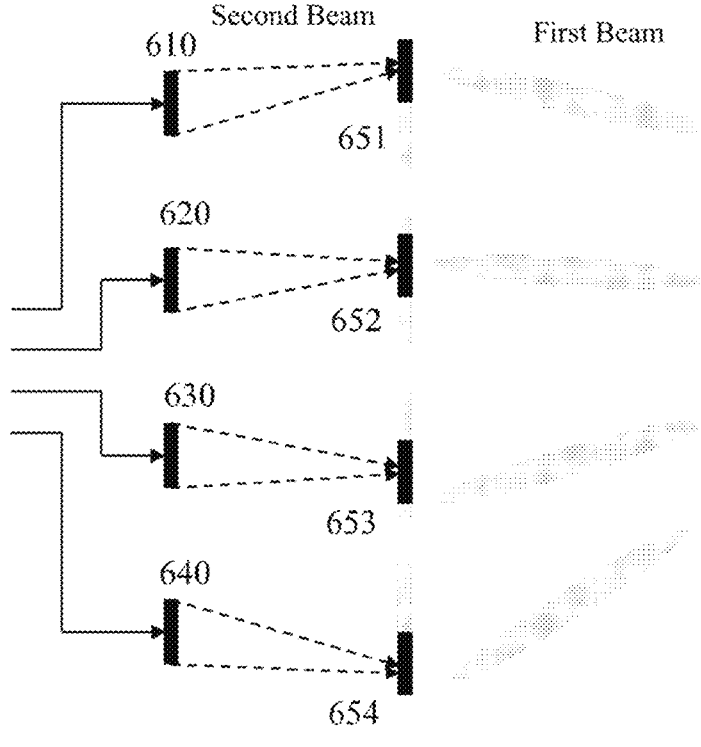
FIG. 6 is a schematic diagram showing that in the transceiving unit shown in FIG. 4A, the control unit configures emitting sub-arrays of a plurality of first sub-arrays according to position information and attitude information of a receiving device.

FIG. 6 is a schematic diagram showing that in the transceiving unit shown in FIG. 4A, the control unit configures emitting sub-arrays of a plurality of first sub-arrays according to position information and attitude information of the receiving device. As described above, in the example shown in FIG. 4A, the transceiving unit of the transmitting device includes a feeding module and a first antenna array, in which the feeding module includes driving components (not shown in FIG. 6) and second antenna arrays. As shown in FIG. 6, the second antenna array includes second sub-arrays 610-640, and the first antenna array includes first sub-arrays 651-654. As shown by the dotted line in FIG. 6, each second array emits a second beam to a corresponding first sub-array. The main light spots formed by the projection of the second beam onto the first sub-arrays are shown by the black parts on the first sub-arrays 651 to 654 in FIG. 6. The control unit 320 may set the distance between the main light spots on the adjacent first sub-arrays according to the position information and attitude information about the receiving device that needs to be communicated with, that is, set the emitting sub-arrays of the respective first sub-arrays. The emitting sub-arrays located in the black area may respectively reflect or transmit the second beams projected onto the sub-arrays, to emit a first beam, as shown by the oval parts in FIG. 6. Therefore, even if the receiving device is not located in the predetermined position or the position of the receiving device changes, the rank of LOS channel can be effectively increased, so that multi-stream transmission can be performed between a plurality of receiving and transmitting antenna array pairs.

For example, Formula 1 can be transformed to obtain Formula 2 below, and the distance $d_T$ between adjacent emitting sub-arrays can be configured according to Formula 2:

$$d_T = \frac{\lambda D}{N d_R \cos\theta_R \cos\theta_T} \tag{2}$$

where, $\lambda$ is the communication wavelength, D is the distance between the receiving device and the transmitting device, N is the number of transmitting and receiving sub-arrays pairs, which, for example, may be determined according to the number of receiving sub-arrays of the receiving device, for example, is the distance between adjacent receiving sub-arrays of the receiving device, $O_R$ is the angle of arrival (AOA) of the receiving device, and $\theta_T$ is the angle of departure (AoD) of the transmitting device. According to Formula 2, it can be seen that when the distance between the receiving device and the transmitting device is smaller, the distance between adjacent emitting sub-arrays is smaller, and vice versa. The receiving device may send one or more of information on the distance between adjacent receiving sub-arrays and information about the number of receiving sub-arrays to the transmitting device. Alternatively, a default distance between adjacent receiving sub-arrays may be used.

Although in the example shown in FIG. 6, the transceiving unit shown in FIG. 4A is described as an example, it should be understood that the same method can also be used in the transceiving units shown in FIGS. 4B and 4C to configure the emitting sub-arrays of the plurality of first sub-arrays. For example, in the example shown in FIG. 4B, a second sub-array driven by a driving sub-array may be determined among a plurality of second sub-arrays based at least in part on the position information and attitude information of the receiving device, to emit a second beam to a corresponding first sub-array. The corresponding first sub-array may be used as an emitting sub-array, and a first beam is emitted according to the main light spot of the second beam on the sub-array.

In addition, according to another example of the present disclosure, the control unit may configure the beams emitted by the emitting sub-arrays of the plurality of first sub-arrays according to the position information and attitude information of the receiving device. For example, when the distance between the receiving device and the transmitting device 300 is less than or equal to a predetermined value, it can be determined that the receiving device is in the near field of the transceiving unit 310. In this case, the first beams may be configured to converge at the receiving device. For example, the control unit may configure one or more of the direction, pattern, and initial phase of the respective first beams according to the position information and attitude information of the receiving device, in order to make the respective first beams converge at the receiving device. Conversely, the respective first sub-arrays may send the same first beams. In addition, when the first beam is narrow, the first beams may also be configured to converge at the receiving device. Conversely, when the first beam is wide, the respective first sub-arrays may send the same first beams.

According to an example of the present disclosure, the receiving device that needs to communicate with the transmitting device 300 may report information about the number of receiving sub-arrays of the receiving device and the spacing between the receiving sub-arrays to the transmitting device 300. In addition, the distance between the receiving device and the transmitting device may be measured by the receiving device that needs to communicate with the transmitting device 300. Alternatively, the distance between the receiving device and the transmitting device may also be measured by the transmitting device 300. For example, the distance between the receiving device and the transmitting device may be measured by reference signals such as positioning reference signal (PRS) and Sounding Reference Signal (SRS), or position sensors such as GPS, or other ranging methods. The above information may be obtained periodically or aperiodically as required.

In terms of information about angles, all the information about angles may be measured by the receiving device and sent to the transmitting device. For example, information about AOA, AOD, and receiving inclination angle may be sent by the receiving device. Alternatively, the AOD may be measured by the transmitting device, and the information about AOA and receiving inclination angle may be sent by the receiving device. For example, the AOD may be measured by beam index, SRS, UE position coordinate, etc. For another example, the AOA may be measured by downlink positioning reference signals such as PRS, or by sensors such as gyroscopes. In addition, the attitude such as the receiving inclination angle of the receiving device may be measured by downlink positioning reference signals such as PRS, or by sensors such as gyroscopes. In an embodiment according to the present disclosure, the AOA and AOD may refer to the AOA and AOD with respect to downlink signals. Similar to the information about distance, the above information about angle may be obtained periodically or aperiodically as required.

In the example described in connection with FIGS. 5 and 6, to guarantee the signal gain, the transmitting device can configure the transceiving unit according to the information about the receiving device that needs to be communicated with, so that good performance can be achieved even for a mobile device in LOS scenarios.

In addition, according to another aspect of the present disclosure, the control unit 320 may also perform beam shaping on the first beam emitted by the emitting sub-array as required. For example, side lobes will be generated around the main light spot of the second beam projected onto the first antenna array, resulting in interference. In view of this, the power of the array elements in the first antenna array may be adjusted. For example, a larger power may be configured for the array elements in the emitting sub-array and a smaller power may be configured for other array elements. For another example, the positions in the first sub-arrays of the first antenna array other than the emitting sub-arrays may be set as random phases or set as off state. Therefore, the first beams emitted by the emitting sub-arrays are beam-shaped, avoiding interference by the side lobes projected by the beams. For another example, when a beam scan is performed, a window function may be used to shape the first beam emitted by the emitting sub-array into a flat-topped beam. In addition, when the signal-to-noise ratio (SNR) does not reach a predetermined value, the second beam may be shaped to illuminate a larger area on the first antenna array, achieving a higher gain of the first beam.

According to another aspect of the present disclosure, in the example according to the present disclosure, in order to adapt to the communications in LOS scenarios, the transceiving unit is usually configured to have a large emitting sub-array spacing. However, some factors, such as large emitting sub-array spacing and non-ideal characteristics of PAA, may lead to large grating lobes for the beams emitted by the emitting end, or generation of grating lobes at the receiving end, which can be suppressed by appropriate improvement. For example, the number of antennas in the receiver may be increased to produce suppression of narrow beam, thereby preventing the generation of grating lobes at the receiving end. For another example, the low side lobes of the RIS beam may be used to suppress the grating lobe generated by the transmitting end.

Figure 7:
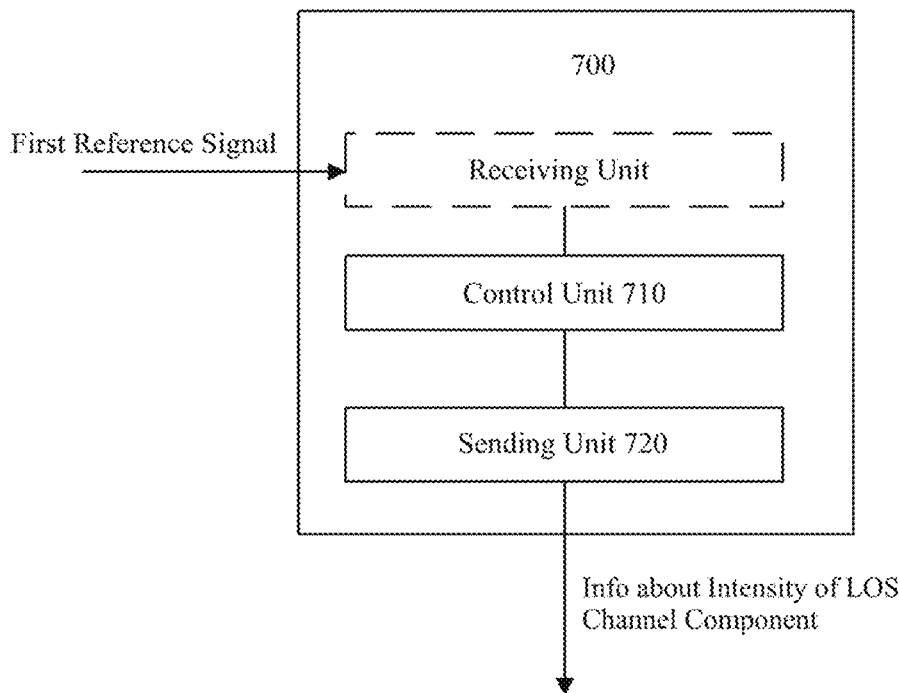
FIG. 7 is a schematic block diagram showing a receiving device according to an embodiment of the present disclosure.

A receiving device according to an embodiment of the present disclosure will be described below with reference to FIG. 7. FIG. 7 is a schematic block diagram showing a receiving device according to an embodiment of the present disclosure. As shown in FIG. 7, the receiving device 700 may include a control unit 710 and a transmitting unit 720. The receiving device 700 may also include other components, however, since these components have nothing to do with the contents of the embodiment of the present disclosure, their illustrations and descriptions are omitted here. In addition, since the receiving device 700 corresponds to the operations of the transmitting device described above with reference to FIGS. 3-6, a detailed description of the same content is omitted here for the sake of simplicity.

As shown in FIG. 7, the control unit 710 determines information on the intensity of a line-of-sight (LOS) channel component in a communication channel. According to an example of the present disclosure, the control unit 710 may perform channel state estimation according to a first reference signal and determine the information about the intensity of the LOS channel component in the communication channel according to the result of the channel state estimation. For example, the control unit 710 may perform channel state estimation according to a downlink reference signal sent by the transmitting device. Specifically, the receiving device 700 may further include a receiving unit to receive the first reference signal from the transmitting device. The first reference signal may include one or more of PRS, SRS, channel state reference signal (CSI-RS), and Tracking Reference Signal, TRS). The control unit 710 may perform channel state estimation according to the first reference signal and determine the information about the intensity of the LOS channel component in the communication channel according to the result of the channel state estimation. The sending unit 720 may send the determined information to the transmitting device. Therefore, the transmitting device can determine whether the current scenario is an LOS scenario according to the information about the intensity of the LOS channel component, so as to determine a configuration mode of the transceiving unit for the transmitting device.

According to another example of the present disclosure, the sending unit 720 also sends at least one of position information and attitude information about the receiving device 700 to the transmitting device. For example, the position information of the receiving device may be the three-dimensional coordinates of the receiving device relative to a reference point in the transmitting device. The position information of the receiving device may include one or more of the distance between the receiving device and the transmitting device, information on a downlink angle of departure (DL-AoD), and information on an uplink angle of arrival (UL-AoA). For another example, the attitude information of the receiving device may be the deflection angles of the receiving device relative to the coordinate axes in the horizontal, vertical, and depth directions. The attitude information of the receiving device may include one or more of information on a downlink angle of arrival (DL-AoA) and information on the receiving inclination angle of the receiving device. In addition, the sending unit 720 may also send other attribute information about the receiving device 700 to the transmitting device. For example, the sending unit 720 may also send information about the number and spacing of the receiving sub-arrays. Therefore, the transmitting device can further adjust the configuration of its transceiving unit according to the above information.

In the above, an example situation has been described of how to determine whether the current scenario is a LOS scenario according to the information about the intensity of the LOS channel component and how to in turn flexibly adjust the transceiving unit of the transmitting device.

In the embodiment according to the present disclosure, after the transceiving unit of the transmitting device adjusts the transceiving unit according to the information about the intensity of the LOS channel component, the configured transceiving unit may be further used for data transmission. With the transmitting device according to the embodiment of the present disclosure, a plurality of mutually independent data streams can be effectively transmitted even in LOS scenarios. For example, in some examples, the channel characteristics of the LOS channel may be used to transmit multiple data streams without precoding. For another example, in still other examples, the respective data streams may be precoded and the precoded data streams may be transmitted.

Hereinafter, the situation in which a plurality of mutually independent data streams are transmitted by using the channel characteristics of the LOS channel without precoding will be further described with reference to FIGS. 8-11.

Figure 8:
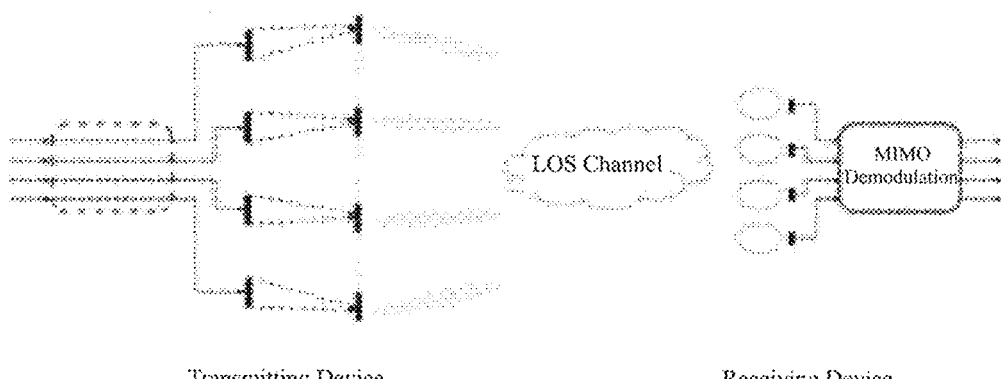
FIG. 8 shows an example schematic diagram of information transmission according to an embodiment of the present disclosure.

FIG. 8 shows an example of information transmission according to an embodiment of the present disclosure. As shown in FIG. 8, there may be N antenna ports (N is greater than or equal to 1) in the antenna array, which are first antenna port, second antenna port, . . . , and N-th antenna port, respectively. These N antenna ports send data streams to the receiving devices respectively. It should be understood by those skilled in the art that the term "antenna port" refers to a logical concept, that is, one antenna port may correspond to the above-described one or more emitting sub-arrays in the first antenna array, or one emitting sub-array in the first antenna array may also correspond to one or more antenna ports. The present disclosure does not limit the correspondence between antenna ports and emitting sub-arrays here. The logical antenna ports are not shown in FIG. 8. Furthermore, it should be understood by those skilled in the art that, in an embodiment according to the present disclosure, the term "data stream" is, for example, un-precoded information or reference signal. For example, the above-described data stream may be indicated through an un-precoded antenna port.

Optionally, the transmitting devices may use the same modulation and coding strategy (MCS) and send data streams through the N antenna ports using the same transmit power. Optionally, each of the N antenna ports of the antenna array may send a data stream for the receiving device, respectively. In an example, the data streams sent by the N antenna ports may be mutually independent un-precoded data streams or reference signals. Accordingly, the receiving device may receive the above-described multiple data streams, and demodulate the respective data streams it receives based on the channel state information, including the information about the intensity of the line-of-sight (LOS) channel component.

In LOS scenarios, an equivalent digital baseband channel matrix H can be expressed as:

$$H = H_{LOS} + H_{NLOS} \tag{3}$$

where $H_{LOS}$ represents the LOS channel component and $H_{NLOS}$ represents the non-LOS channel component. For example, in the scenario in which LOS transmission is performed using a high-frequency band as shown in FIG. 1, the intensity of the LOS channel component is strong, whereas the intensities of other non-LOS channel components (including reflection path and scattering path) are weak. Moreover, the LOS channel component $H_{LOS}$ is related to the relative position between the transmitting device (such as the base station) and the receiving device (such as the terminal device). In some embodiments of the present disclosure, the LOS channel component $[H_{LOS}]_{i,j}$ between the i-th antenna port of the receiving device and the j-th antenna port of the transmitting device can be expressed as:

$$[H_{LOS}]_{i,j} \approx \sqrt{\beta} \cdot \exp\left(-j\frac{2\pi}{\lambda}d_{RIS-UE}^{(i,j)}\right) \tag{4}$$

where $\beta$ is the path loss, and $d_{RIS-UE}^{(i,j)}$ is the distance between the receiving sub-array corresponding to the i-th antenna port of the receiving device and the emitting sub-array corresponding to the j-th antenna port of the transmitting device in the case that the first antenna array in the transmitting device is a RIS and the receiving device is a UE according to an embodiment of the present disclosure. As an example, in the case that the i-th antenna port of the receiving device corresponds to a receiving sub-array and the j-th antenna port of the transmitting device corresponds to an emitting sub-array, $d_{RIS-UE}^{(i,j)}$ is the distance between the receiving sub-array corresponding to the i-th antenna port of the receiving device and the emitting sub-array corresponding to the j-th antenna port of the transmitting device. As another example, in the case that the i-th antenna port of the receiving device corresponds to a receiving sub-array and the j-th antenna port of the transmitting device corresponds to two emitting sub-arrays, $d_{RIS-UE}^{(i,j)}$ is the average distance between the receiving sub-array corresponding to the i-th antenna port of the receiving device and the two emitting sub-arrays corresponding to the j-th antenna port of the transmitting device. The present disclosure is not limited thereto.

Here, when the emitting sub-array spacing of the transmitting device and the receiving sub-array spacing of the receiving device satisfy the optimal spacing expressed by Formula 1 or Formula 2, it can be achieved that $$H_{LOS} \cdot H_{LOS}^{*T} \approx \beta \cdot I \tag{5}$$

where I is the identity matrix, and $H_{LOS}^{*T}$ is the conjugate transpose matrix of $H_{LOS}$. At this point, the LOS channel component $H_{LOS}$ and $H_{LOS}^{*T}$ approximately satisfy an orthogonal relationship. In the scenario in which transmission is performed by using a high-frequency band as shown in FIG. 1, since the intensities of the non-LOS channel components are weaker than that of the LOS channel component, the equivalent digital baseband channel matrix H also approximately satisfies the orthogonal relationship. From the above, it can be seen that the control unit of the receiving device can demodulate multiple un-precoded data streams sent by the respective antenna ports according to an estimated value $\hat{H}$ of the equivalent digital baseband channel matrix H.

For example, the control unit of the receiving device may perform channel estimation based on a reference signal sent by the transmitting device, such as a channel state information reference signal (CSI-RS) or a demodulation reference signal (DM-RS), to determine an estimated value $\hat{H}$ of the equivalent digital baseband channel matrix H. Subsequently, the receiving device may demodulate the received data streams according to the estimated value $\hat{H}$. Any MIMO detection algorithm may be used to demodulate the received data streams. For example, when the emitting sub-array spacing of the transmitting device and the receiving sub-array spacing of the receiving device satisfy the optimal spacing expressed by Formula 1 or Formula 2, the receiving device may demodulate the received data streams using matched filtering (MF). The performance of matched filtering (MF) is close to optimal, with a very low complexity. Alternatively, the receiving device may demodulate the received data streams using other MIMO detecting methods. For example, the receiving device may demodulate the received data streams using minimum mean square error (MMSE) estimation. The present disclosure is not limited thereto.

For another example, the control unit of the receiving device may also determine an equivalent digital baseband channel matrix for the respective one of the plurality of antenna ports according to the state information of the transmitting device, at least one of the position information, and attitude information of the receiving device, and the information about the intensity of the line-of-sight (LOS) channel component. In some examples, the estimated value $\hat{H}_{LOS}$ of the line-of-sight (LOS) channel component $H_{LOS}$ may be approximately calculated directly from the state information of the transmitting device, at least one of the position information and attitude information of the receiving device, and the information about the intensity of the LOS channel component. Based on the estimated value $\hat{H}_{LOS}$ of the LOS channel component $H_{LOS}$, the receiving device may demodulate the respective data streams it receives by using the matched filtering method with Formula 5.

Figure 9:
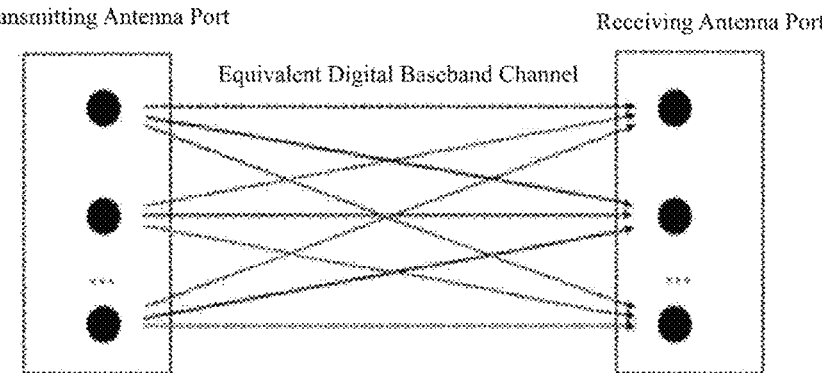
FIG. 9 shows a schematic diagram of transmission when the spacing between a transmitting device and a receiving device satisfies an optimal spacing according to an embodiment of the present disclosure.

FIG. 9 shows a schematic diagram of beam transmission between an emitting sub-array and a receiving device according to an embodiment of the present disclosure. As shown in FIG. 9, the beams emitted by the transmitting device through the respective emitting sub-arrays are focused on the receiving device. Therefore, according to the above description, the data streams may be sent through the LOS channel at the transmitting device. The respective antenna ports may be used to send multiple un-precoded data streams, and at the receiving device, the estimated value $\hat{H}$ of the equivalent digital baseband channel matrix H for the respective one of the plurality of antenna ports may be obtained through channel estimation, and the data streams received through the LOS channel may be demodulated according to the estimated value of the equivalent digital baseband channel matrix. Therefore, the transmission of multiple data streams can be implemented without feeding back precoding information, thereby saving the system resources occupied by signaling transmission, reducing the computational complexity, and improving the information transmission efficiency. Or, the estimated value $\hat{H}_{LOS}$ of the LOS channel component $H_{LOS}$ in the equivalent digital baseband channel matrix H for the respective one of the plurality of antenna ports can be obtained at the receiving device through at least one of the state information of the transmitting device, the position information, and attitude information of the receiving device, as well as the information about the intensity of the LOS channel component, and the data streams received through the LOS channel can be demodulated according to the estimated value. Therefore, the requirements by the receiving device for estimation of equivalent digital baseband channel matrix can be reduced, thereby further reducing the computational complexity and signaling overhead, improving the information transmission efficiency.

Figure 10:
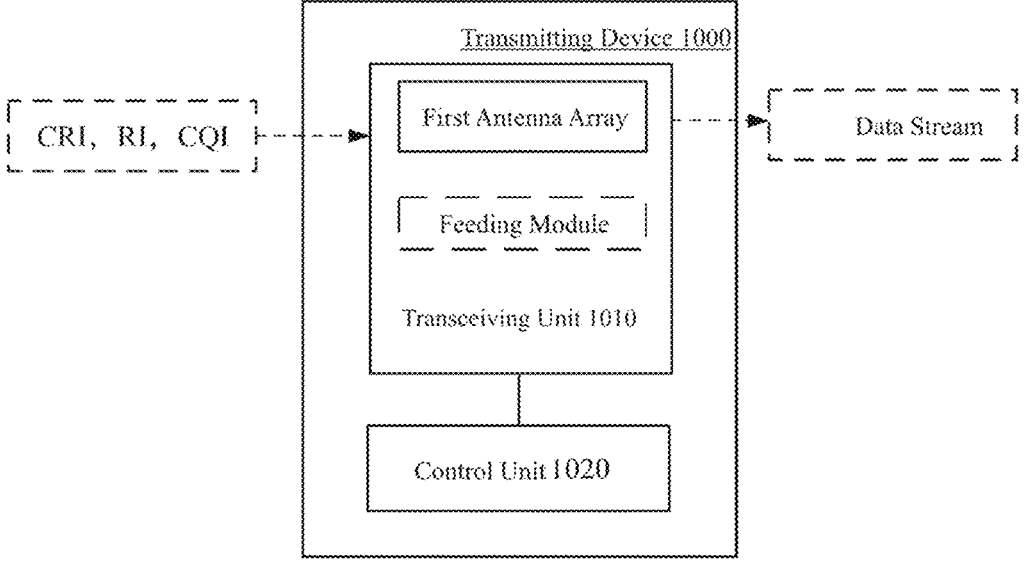
FIG. 10 is a schematic block diagram showing a transmitting device according to an embodiment of the present disclosure.
Figure 11:
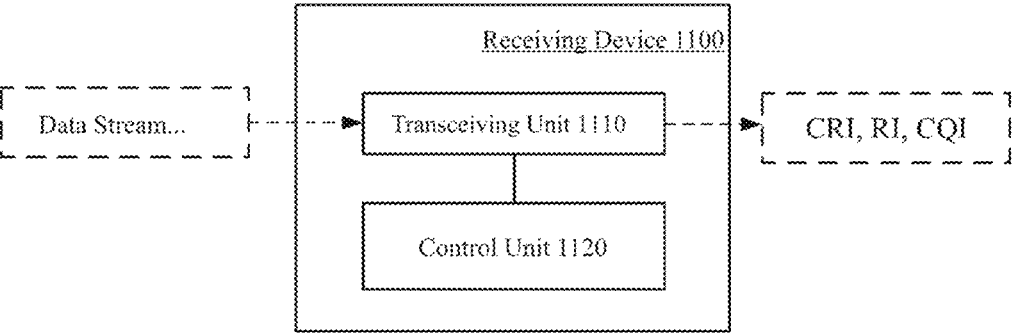
FIG. 11 is a schematic block diagram showing a receiving device according to an embodiment of the present disclosure.

FIGS. 10 and 11 show exemplary block diagrams of a transmitting device that uses the channel characteristics of the LOS channel to transmit multiple data streams without precoding during data transmission according to an example of the present disclosure, and a corresponding receiving device. Specifically, FIG. 10 is a schematic block diagram showing a transmitting device 1000 according to an embodiment of the present disclosure. As shown in FIG. 10, a transmitting device 1000 according to an embodiment of the present disclosure may include a control unit 1020 and a transceiving unit 1010. In addition to the control unit and the transceiving unit, the transmitting device 1000 may also include other components, however, since these components have nothing to do with the contents of the embodiment of the present disclosure, their illustrations and descriptions are omitted here.

Similar to the transmitting device shown in FIGS. 3-6, in the example shown in FIG. 10, specifically, the transceiving unit 1010 of the transmitting device 1000 may include a first antenna array. Optionally, the transceiving unit 1010 may further include a feeding unit. In addition, in the example shown in FIG. 10, it is assumed that the current communication scenario is an LOS scenario according to the example shown in FIG. 10, that is, the transmitting device knows the information about the intensity of the line-of-sight (LOS) channel component.

The control unit 1020 of the transmitting device 1000 may be configured to determine multiple data streams for the data streams of the receiving device. Then, one data stream for the data streams of the receiving device is sent using each of the plurality of antenna ports in the transceiving unit 1020.

According to an example of the present disclosure, the respective data streams sent with the same modulation and coding strategy (MCS) and the same transmit power may be sent through the plurality of antenna ports in the transceiving unit 1010, to reduce the complexity of the transmitting device. According to another example of the present disclosure, the transceiving unit 1010 of the transmitting device 1000 utilizes a plurality of antenna ports, and the data streams sent through the plurality of antenna ports may be the same or different multiple data streams. For example, the transmitting device 1000 may determine the number of the sent different data streams according to at least one of the rank indicator, the distance between the antenna port and the receiving device, and the range of the signal-to-noise ratio (SNR). For example, the rank indicator is fed back by the receiving device. For example, when the distance between the transmitting device 1000 and the receiving device is relatively close and the SNR is relatively high, the transceiving unit 1010 may sent relatively many different number of data streams. For another example, when the distance between the transmitting device 1000 and the receiving device is relatively far and the SNR is relatively low, the transceiving unit 1010 may reduce the number of the sent different data streams. For example, the mapping relationship between antenna ports and emitting sub-arrays may be further adjusted. For example, two emitting sub-arrays are mapped to the same antenna port, to reduce the number of the sent different data streams.

In the example shown in FIG. 10, the transmitting device 1000 may not precode the data streams, that is, the data stream transmitted through the respective antenna ports of the transceiving unit 1020 may be an un-precoded data stream or a reference signal. Therefore, in the example shown in FIG. 10, in the stage of channel state report acquisition, the information about the channel state acquired by the transmitting device from the receiving device may not include a precoding matrix indicator (PMI). In this case, the transmitting device 1000 may receive at least one of channel state information reference signal resource indicator, rank indicator and channel quality indicator sent by the receiving device.

Hereinafter, a receiving device corresponding to the transmitting device shown in FIG. 10 according to an embodiment of the present disclosure will be described with reference to FIG. 11. FIG. 11 is a schematic block diagram showing a receiving device 1100 according to an embodiment of the present disclosure. As shown in FIG. 11, a receiving device 1100 according to an embodiment of the present disclosure may include a transceiving unit 1110 and a control unit 1120. In addition to the transceiving unit and the control unit, the receiving device 1100 may also include other components, however, since these components have nothing to do with the contents of the embodiment of the present disclosure, their illustrations and descriptions are omitted here.

As shown in FIG. 11, the transceiving unit 1110 of the receiving device 1100 may be configured to receive data streams sent through the transceiving unit including a plurality of antenna ports in the transmitting device, in which each antenna port sends a data stream for the receiving device.

As described above in connection with FIGS. 8 to 11, the control unit 1120 may perform channel estimation to obtain an estimated value of the equivalent digital baseband channel matrix for the respective one of the plurality of antenna ports, and demodulate the data stream according to the estimated value of the equivalent digital baseband channel matrix.

According to an example of the present disclosure, the control unit 1120 may obtain an estimated equivalent digital baseband channel matrix according to a result of the channel estimation, and demodulate the data stream according to the equivalent digital baseband channel matrix. Any MIMO detection algorithm may be used to demodulate the received data stream. For example, the control unit 1120 may perform minimum mean square error (MMSE) demodulation or matched filtering (MF) demodulation on the data stream.

According to an example of the present disclosure, the control unit 1120 may determine an equivalent digital baseband channel matrix for the respective ones of the plurality of antenna ports according to the state information of the transmitting device, at least one of the position information and attitude information of the receiving device, and the information about the intensity of the line-of-sight (LOS) channel component, and demodulate the multiple data streams according to the equivalent digital baseband channel matrix.

In the example shown in FIG. 11, since the transmitting device corresponding to the receiving device 1100 does not precode the data stream, the receiving device 1100 may not send a precoding matrix indicator (PMI) to the transmitting device. In this case, the transceiving unit 1110 may send at least one of the channel state information reference signal resource indicator, rank indicator and channel quality indicator to the transmitting device, to report the channel state. Therefore, information transmission can be implemented without feeding back precoding information by only feeding back channel-state related information including channel state information, reference signal resource indicator, rank indicator, channel quality indicator, and the like to the transmitting device, thereby saving the system resources occupied by signaling transmission, reducing the calculation complexity and improving the information transmission efficiency.

In this example, information transmission can be implemented between the transmitting device and the receiving device without precoding, and the inter-stream interference of the LOS channel is effectively eliminated, improving the performance of multi-stream transmission of the LOS channel, and expanding the capacity of the LOS MIMO channel. According to the above-described receiving device, the data streams sent through the plurality of antenna ports therein that it receives may be un-precoded data streams or reference signals, so that the transmitting device can determine the data streams to be sent by the respective antenna ports without relying on CSIT (Channel State Information at the transmitter). Therefore, the complexity of the transceiver of the transmitting device is reduced, reducing the channel estimation and feedback overhead, and improving the channel utilization rate. At the same time, the operational complexity of MIMO detection at the receiving device is correspondingly reduced.

Hereinafter, a situation in which the respective data streams are precoded and the precoded data streams are transmitted will be described in connection with FIGS. 12-14. When the emitting sub-array spacing of the transmitting device and the receiving sub-array spacing of the receiving device satisfy the optimal spacing related to the transceiver distance expressed by Formula 1 or Formula 2, a precoding vector focused on other focus may be obtained by deflecting a precoding vector focused on the reference focus based on discrete Fourier transform (DFT) vector. In addition, the deflected focused precoder vectors are orthogonal to each other, that is, the focus after the deflection is at the zero point of other focused precoder vectors. In view of this, according to another embodiment of the present disclosure, there is proposed a simplified feeding back mode for the Precoding Matrix Indicator (PMI).

Hereinafter, a receiving device and a transmitting device according to another embodiment of the present disclosure will be illustrated with reference to FIGS. 12 and 13, respectively. FIG. 12 is a schematic block diagram showing a receiving device according to another embodiment of the present disclosure. FIG. 13 is a schematic block diagram showing a transmitting device according to another embodiment of the present disclosure. As shown in FIG. 12, a receiving device 1200 according to another embodiment of the present disclosure may include a control unit 1210 and a transceiving unit 1220. As shown in FIG. 13, a transmitting device according to another embodiment of the present disclosure may include a transceiving unit 1310 and a control unit 1320. In addition to the illustrated respective components, the receiving device 1200 and the transmitting device 1300 may also include other components, however, since these components have nothing to do with the contents of the embodiment of the present disclosure, their illustrations and descriptions are omitted here.

Figure 12:
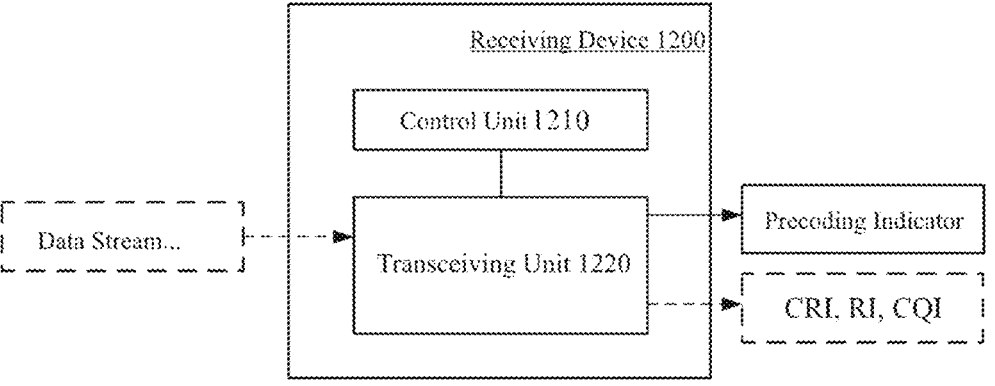
FIG. 12 is a schematic block diagram showing a receiving device according to another embodiment of the present disclosure.

In an embodiment according to the present disclosure, when it is determined that the current communication scenario is a LOS scenario according to the information about the intensity of the LOS channel component, as shown in FIG. 12, the control unit 1210 of the receiving device 1200 may be configured to determine a PMI for a first antenna port of a plurality of antenna ports of a transmitting device or the receiving device, in which the PMI corresponds to the first antenna port of the plurality of antenna ports of the transmitting device. Or, the PMI corresponds to the first antenna port of the plurality of antenna ports of the receiving device.

According to an example of the present disclosure, the PMI includes information of a precoder associated with the first antenna port. For example, the information of the precoder associated with the first antenna port may be phase deflection information associated with the first antenna port. According to an example of the present disclosure, the first antenna port may be predetermined by the transmitting device and the receiving device. According to another example of the present disclosure, the first antenna port may be determined by the receiving device, and the result of the determination may be notified to the transmitting device. For example, the receiving device may send an identifier of the first antenna port to the transmitting device in advance, or send an identifier of the first antenna port to the transmitting device together with the PMI.

For example, the identifier of the first antenna port may be identified using an identifier related to an antenna port. As an example, the above identifier may be a Channel State Information Resource Indicator (CRI). For another example, the information of the precoder of the first antenna port may be indicated by a set of phase deflection sequences. As an example, the above phase deflection sequence may be a sequence obtained by quantizing the phases between $[0, 2\pi]$ with b bits. Optionally, the phase deflection sequence may include $N-1$ values, where N is equal to the number of data streams transmitted to the receiving device.

Optionally, the control unit of the receiving device 1200 may determine the above PMI through channel estimation. For example, the transmitting device 1300 may send a channel state information reference signal (CSI-RS) to the receiving device 1100, and then the receiving device 1100 may estimate the CSI and determine the PMI based on the estimated CSI. The present disclosure is not limited thereto.

For example, in the case that the control unit 1210 has determined the PMI, the transceiving unit 1220 may send the PMI to the transmitting device. As shown in FIG. 12, the transceiving unit 1200 may include an antenna array for receiving and sending data streams. Optionally, the transceiving unit 120 may be further configured to send at least one of channel state information reference signal resource indicator (CRI), rank indicator (RI) and channel quality information (CQI) to the transmitting device.

Figure 13:
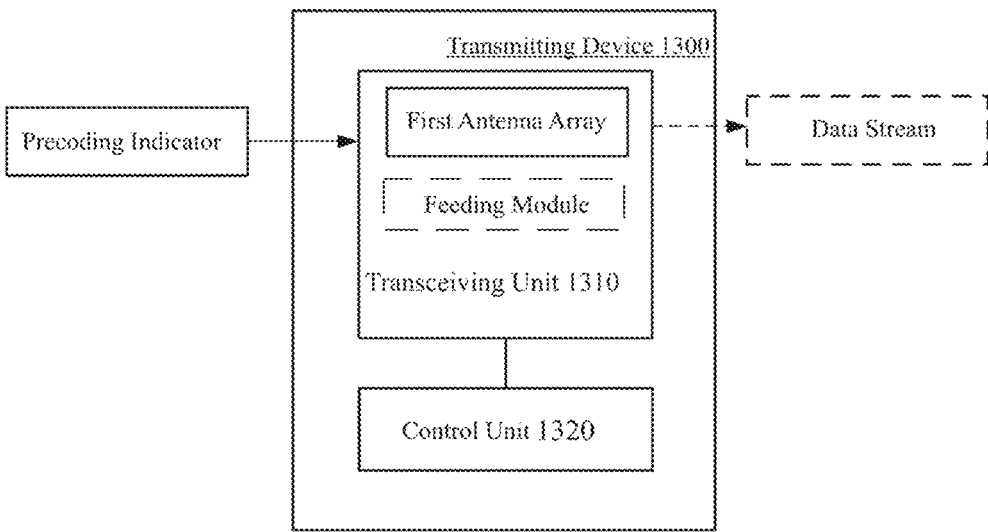
FIG. 13 is a schematic block diagram showing a transmitting device according to another embodiment of the present disclosure.

On the other hand, as shown in FIG. 13, according to another embodiment of the present disclosure, the transceiving unit 1310 of the transmitting device 1300 includes a first antenna array. Optionally, the transceiving unit 1310 of the transmitting device 1300 may include a feeding unit. The interaction scheme and configuration scheme between the respective components in the transceiving unit 1310 of the transmitting device 1300 have been described in detail with reference to FIGS. 4A to 7, which will not be detailed here by the present disclosure.

The transceiving unit 1310 may be configured to receive a precoding indicator from the receiving device 1200, in which the precoding indicator corresponds to the first antenna port of the plurality of antenna ports of the transmitting device 1300 or the receiving device 1200.

Next, the control unit 1320 determines precoder information associated with the plurality of antenna ports of the transmitting device according to the PMI. According to an example of the present disclosure, the control unit 1320 may be configured to determine the precoder information of the transmitting device according to the PMI and a DFT vector. In an example of the present disclosure, the respective antenna port of the transmitting device respectively sends a data stream precoded according to the precoder information corresponding to the antenna port. The data stream includes a demodulation reference signal (DM-RS) or downlink data or uplink data.

As described above, the LOS channel component is related to the relative position between the transmitting device and the receiving device. When the emitting sub-array spacing of the transmitting device and the receiving sub-array spacing of the receiving device satisfy the optimal spacing related to the transceiver distance expressed by Formula 1 or Formula 2, all the eigenvalues of the LOS channel components are approximately equal, and during multi-stream transmission the gains of the respective streams are approximately equal, thereby maximizing the transmission rate. Matched filtering (MF) may be used for precoding to implement the above transmission rate optimization. Therefore, in the following examples of the present disclosure, the respective antenna ports send the data streams with the same power and using the same modulation and coding scheme (MCS).

Figure 14:
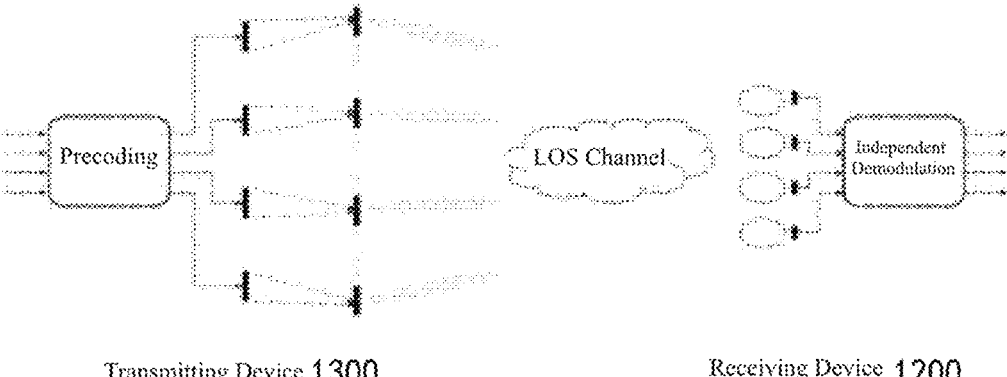
FIG. 14 shows a schematic diagram of an example of information transmission according to an embodiment of the present disclosure.

Specifically, referring to FIG. 14, it is assumed that there are N antenna ports (N is greater than or equal to 1), which are first antenna port, second antenna port, . . . , and N-th antenna port, respectively. These N antenna ports will send precoded data streams to the receiving device 1200. It should be understood by those skilled in the art that the term "antenna port" refers to a logical concept, that is, one antenna port may correspond to one or more emitting sub-arrays in above-described the first antenna array, or one emitting sub-array in the first antenna array may also correspond to one or more antenna ports. The present disclosure does not limit the correspondence between antenna ports and emitting sub-arrays here. The logical antenna ports are not shown in FIG. 14. Furthermore, it should be understood by those skilled in the art that, in an embodiment according to the present disclosure, the term "data stream" is, for example, un-precoded information or reference signal. For example, the above data stream may be indicated through an un-precoded antenna port.

For example, it is assumed that all the N antenna ports in FIG. 14 send precoded data streams to the receiving device 1200. And it is assumed that the transmitting device 1300 has received the PMI for the first antenna port, which includes the information of the precoder for the first antenna port. And it is assumed that the transmitting device 1300 knows the identifier of the first antenna port.

The transmitting device 1300 will determine a precoder for precoding data streams transmitted by the respective antenna ports based on the information of the precoder for the first antenna port. For example, the information about the precoder of the first antenna port of the transmitting device 1300 may indicate a first digital precoder:

$$w^{(1)} = \begin{bmatrix} w_1^{(1)} & w_2^{(1)} & \ldots & w_N^{(1)} \end{bmatrix} \tag{6}$$

where the phases of $w_2^{(1)}$, . . . , $w_N^{(1)}$ may each be identified with b bits, which indicates the information about the quantized phase deflection relative to W within the phase range of $[0, 2\pi]$. Therefore, the transmitting device may precode and send the N data streams using $w_1^{(1)}$ to the receiving device through the first antenna port.

In addition, according to another example of the present disclosure, the transmitting device 1300 may also deflect the first precoder through a DFT vector to determine a precoder for precoding the data streams sent through other antenna ports. According to an example of the present disclosure, the DFT vector may be pre-stored in the transmitting device. More specifically, the transmitting device may select a DFT vector according to the value of N from a set of pre-stored DFT vectors.

Specifically, a precoding matrix W composed of N digital precoders can be calculated as follows:

$$W = \begin{bmatrix} 1 & 1 & 1 & 1 \\ 1 & e^{-2\pi j \frac{1}{N}} & \ldots & e^{-2\pi j \frac{N-1}{N}} \\ 1 & \vdots & \ddots & \vdots \\ 1 & e^{-2\pi j \frac{N-1}{N}} & \ldots & e^{-2\pi j \frac{(N-1)(N-1)}{N}} \end{bmatrix} \cdot \begin{bmatrix} w_1^{(1)} & & & \\ & w_2^{(1)} & & \\ & & \ddots & \\ & & & w_N^{(1)} \end{bmatrix} \tag{7}$$

where, the n-th row of the precoding matrix W represents a precoder for precoding the data stream transmitted through the n-th antenna port.

In an example of the present disclosure, the receiving device 1200 may independently decode the above-described data stream that is transmitted after being precoded by the precoder W and received by its various antenna ports.

Although in the example shown in FIG. 14, description is made with examples in which the first antenna port is an antenna port in the transmitting device, it should be understood that a similar method is also applicable to the case where the first antenna port is an antenna port in the receiving device.

Figure 15:
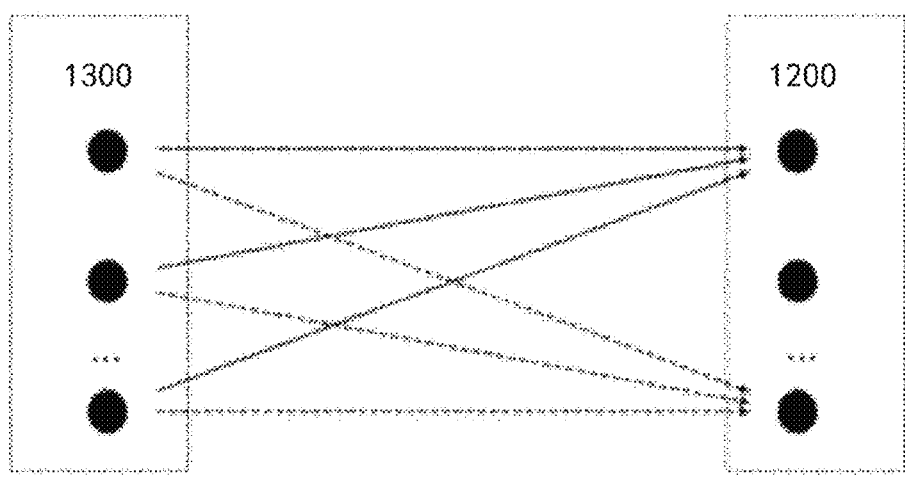
FIG. 15 shows another schematic diagram of transmission when the spacing between a transmitting device and a receiving device satisfies an optimal spacing according to an embodiment of the present disclosure.

Referring to FIG. 15, FIG. 15 shows with solid lines a data stream sent out after being precoded by the above-described precoder, and with dotted lines another data stream sent out after being precoded by the above-described precoder. The precoding vectors that precode the above two data streams are obtained by the DFT vector deflection of Formula 7. Therefore, the above precoding vectors satisfy an orthogonal relationship and will not interfere with each other. Therefore, the receiving device 1200 can independently decode the data streams received by its respective antenna ports without additional MIMO detection.

In another example of the present disclosure, the receiving device 1200 may also use an MMSE reception scheme to decode the above-described data streams, which is not limited by the present disclosure.

Therefore, in an example of the present disclosure, the transmitting device 1300 and the receiving device 1200 can eliminate the inter-stream interference of the LOS channel just by using a simple precoding scheme, thereby realizing the multi-stream transmission of the LOS channel and expanding the capacity of the LOS MIMO channel. Furthermore, as described above, in the case where the PMI is acquired, the transmitting device can calculate the precoding matrix without relying on CSIT (Channel State Information at the Transmitter). Therefore, the complexity of the transceiver of the transmitting device is reduced, reducing the channel estimation and feedback overhead, and improving the channel utilization rate. The receiving device can independently demodulate the data streams sent by the respective antenna ports without MIMO detection, reducing the complexity of the transceiver of the receiving device and improving the receiving performance of the receiving device.

Figure 16:
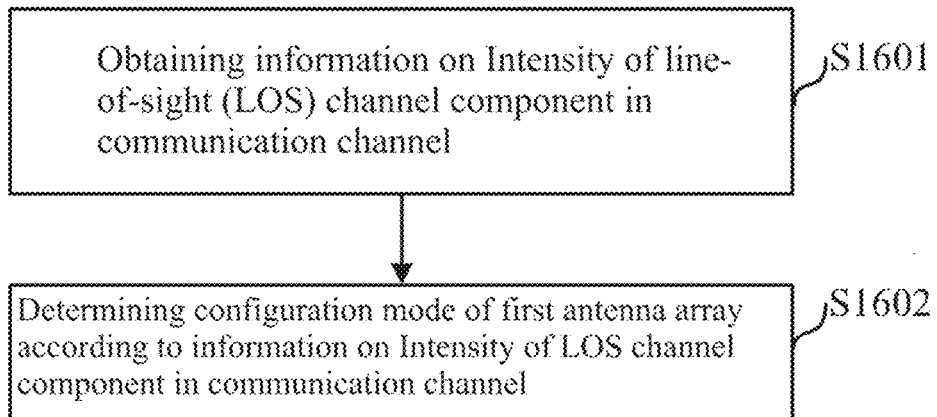
FIG. 16 is a flowchart of a configuring method according to an embodiment of the present disclosure.

The transmitting device and the receiving device according to the embodiments of the present disclosure have been described above with reference to FIGS. 3 to 15. Next, a configuring method and an information sending method of an embodiment of the present disclosure will be described. FIG. 16 is a flowchart of a configuring method 1600 according to an embodiment of the present disclosure. Since the steps of the configuring method 1600 correspond to the operations of the transmitting device 300 described above with reference to FIGS. 3-6, a detailed description of the same content is omitted here for the sake of simplicity. The configuring method 1600 can be applied to, for example, the transmitting device shown in FIG. 3. Specifically, the transmitting device to which the configuring method 1600 is applied may include a transceiving unit and a control unit, in which the transceiving unit may include a first antenna array. For example, the first antenna array may be an RIS. For another example, the first antenna array may be a PAA or a lens array antenna. Optionally, the first antenna array may be divided into a plurality of first sub-arrays. Each first sub-array may include one or more array elements.

As shown in FIG. 16, in step S1601, information on the intensity of a line-of-sight (LOS) channel component in a communication channel is obtained. For example, the information about the intensity of the LOS channel component may be a K factor representing a ratio of the intensity of the LOS channel component to the intensity of the non-line-of-sight (LOS) channel component. In addition, the information about the intensity of the LOS channel component may also be other information indicating whether an LOS path exists or is relatively strong or weak.

In an example according to the present disclosure, in step S1601, the intensity of the LOS channel component in the communication channel may be estimated to obtain the information about the intensity of the LOS channel component. Alternatively, the intensity of the LOS channel component in the communication channel may also be estimated by the receiving device to be in communication with the transmitting device, and the information about the intensity of the LOS channel component may be sent to the transmitting device. In step S1601, the information about the intensity of the LOS channel component from the receiving device may be received.

In step S1602, a configuration mode of a first antenna array is determined according to the information about the intensity of the LOS channel component in the communication channel. According to an example of the present disclosure, when it is determined that the communication channel satisfies a predetermined channel condition according to the information about the intensity of the line-of-sight (LOS) channel component in the communication channel, in step S1602, it may be determined that the current communication scenario is an LOS scenario, and the first antenna array 311 is configured to be suitable for communications of LOS scenarios. For example, when the K factor is greater than or equal to a predetermined value, it may be determined that the current communication scenario is an LOS scenario. In this case, in step S1602, the first antenna array may be configured to be suitable for communications in LOS scenarios. Therefore, the transmitting device according to the embodiments of the present disclosure can determine whether the current scenario is an LOS scenario according to the information about the intensity of the LOS channel component in the communication channel, and in turn, flexibly adjust the first antenna array in the transceiving unit.

According to an example of the present disclosure, when it is determined that the communication channel satisfies the predetermined channel condition according to the information about the intensity of the LOS channel component in the communication channel, in step S1602, the first antenna array may be configured according to at least one of the position information and attitude information of the receiving device. As described above, as an example, the first antenna array may include a plurality of first sub-arrays. When it is determined that the communication channel satisfies the predetermined channel condition according to the information about the intensity of the LOS channel component in the communication channel, in step S1602, the emitting sub-arrays of the plurality of first sub-arrays may be configured according to at least one of the position information and attitude information of the receiving device. For example, in step S1602, the distance between adjacent emitting sub-arrays may be configured according to at least one of the position information and attitude information of the receiving device. For another example, in step S1602, the beams emitted by the emitting sub-arrays may be configured according to at least one of the position information and attitude information of the receiving device.

In addition, in another example of the present disclosure, the transceiving unit in the transmitting device may further include a feeding module for feeding the first antenna array. The feeding module may include a plurality of feeding modules respectively corresponding to the plurality of first sub-arrays. When it is determined that the communication channel satisfies the predetermined channel condition according to the information about the intensity of the LOS channel component in the communication channel, in step S1602, the first antenna array may be configured through the feeding module according to at least one of the position information and attitude information of the receiving device.

According to an example of the present disclosure, in step S1602, it may be determined whether the distance between the receiving device and the transmitting device satisfies a predetermined distance condition according to the position information of the receiving device, and the emitting sub-arrays of the plurality of first sub-arrays may be configured. For example, when it is determined that the distance between the receiving device and the transmitting device is less than or equal to the predetermined distance condition according to the position information of the receiving device, in step S1602, a predetermined sub-array or a predetermined part of the plurality of first sub-arrays may be used as the emitting sub-arrays. Therefore, the emitting sub-array can be simply configured at the transmitting device to be suitable for LOS communication scenarios.

According to another example of the present disclosure, in step S1602, the emitting sub-arrays of the plurality of first sub-arrays may be configured at least partially according to the position information and attitude information of the receiving device. For example, in step S1602, it may be determined which parts or which sub-arrays of the plurality of first sub-arrays are used as the emitting sub-arrays at least partially based on the position information and attitude information of the receiving device. As an example, in step S1602, it may be determined which parts or which sub-arrays of the plurality of first sub-arrays are used as the emitting sub-arrays based on the position information and attitude information of the receiving device according to the above Formula 2. Therefore, the emitting sub-arrays can be accurately configured at the transmitting device according to the specific terminal to be suitable for LOS communication scenarios, improving the system's performance.

Furthermore, according to another example of the present disclosure, in step S1602, the beams emitted by the emitting sub-arrays of the plurality of first sub-arrays may be configured according to the position information and attitude information of the receiving device. For example, when the distance between the receiving device and the transmitting device is less than or equal to the predetermined value, it may be determined that the receiving device is in the near field of the transceiving unit. In this case, in step S1602, the first beams may be configured to converge at the receiving device. For example, in step S1602, one or more of the direction, pattern and initial phase of the respective first beams may be configured according to the position information and attitude information of the receiving device, so that the respective first beams can converge at the receiving device. Conversely, the respective first sub-arrays may send the same first beams. In addition, when the first beam is narrow, the first beams may also be configured to converge at the receiving device. Conversely, when the first beam is wide, the respective first sub-arrays may send the same first beams.

Through the configuring method according to the embodiment of the present disclosure, to guarantee the signal gain, the transmitting device can configure the transceiving unit according to the information about the receiving device that needs to be communicated with, so that good performance can be achieved even for a mobile device in LOS scenarios.

Figure 17:
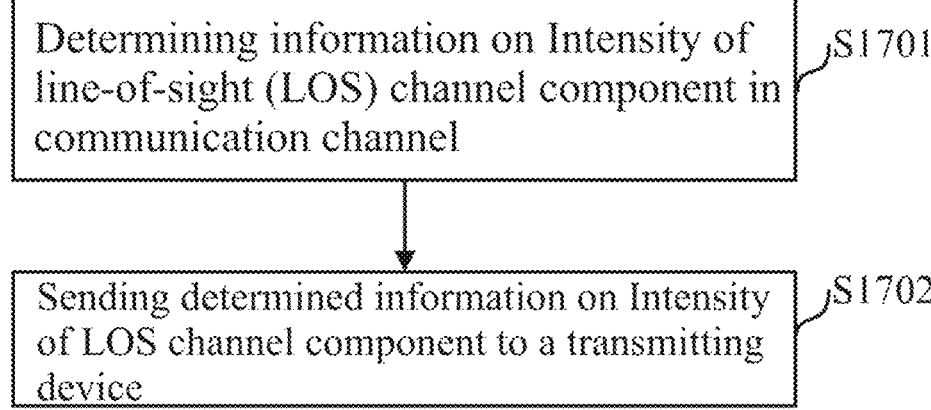
FIG. 17 is a flowchart of a method performed by a receiving device according to an embodiment of the present disclosure.

FIG. 17 is a flowchart describing an information sending method 1700 performed by a receiving device according to an embodiment of the present disclosure. Since the steps of the information sending method 1700 correspond to the operations of the receiving device 700 described above with reference to FIG. 7, a detailed description of the same content is omitted here for the sake of simplicity.

As shown in FIG. 17, in step S1701, information on the intensity of a line-of-sight (LOS) channel component in a communication channel is determined. According to an example of the present disclosure, in step S1701, channel state estimation may be performed according to a first reference signal, and the information about the intensity of the LOS channel component in the communication channel may be determined according to a result of the channel state estimation. For example, in step S1701, the channel state estimation may be performed according to a downlink reference signal sent by the transmitting device. Specifically, the method 1700 may further include receiving the first reference signal from the transmitting device. The first reference signal may include one or more of PRS, SRS, channel state reference signal (CSI-RS) and Tracking Reference Signal, TRS). In step S1701, channel state estimation may be performed according to the first reference signal, and the information about the intensity of the LOS channel component in the communication channel may be determined according to the result of the channel state estimation. Therefore, the transmitting device can determine whether the current scenario is an LOS scenario according to the information about the intensity of the LOS channel component, so as to determine the configuration mode of the transceiving unit for the transmitting device. Then, in step S1702, the determined information about the intensity of the LOS channel component is sent to the transmitting device. Therefore, the transmitting device can determine whether the current scenario is an LOS scenario according to the information about the intensity of the LOS channel component, so as to determine the configuration mode of the transceiving unit for the transmitting device.

According to another example of the present disclosure, the information transmitting method 1700 may further include sending at least one of position information and attitude information about the receiving device to the transmitting device. For example, the position information of the receiving device may be the three-dimensional coordinates of the receiving device relative to a reference point in the transmitting device. The position information of the receiving device may include one or more of the distance between the receiving device and the transmitting device, information about the downlink angle of departure (DL-AoD), and information about the uplink angle of arrival (UL-AoA). For another example, the attitude information of the receiving device may be the deflection angles of the receiving device relative to the coordinate axes in the horizontal, vertical, and depth directions. The attitude information of the receiving device may include one or more of information about the downlink angle of arrival (DL-AoA) and information about the receiving inclination angle of the receiving device. In addition, the information sending method 1700 may further include sending other attribute information about the receiving device to the transmitting device. For example, the information sending method 1700 may further include sending information about the number and spacing of the receiving sub-arrays. Therefore, the transmitting device can further adjust the configuration of its transceiving unit according to the above information.

Figure 18:
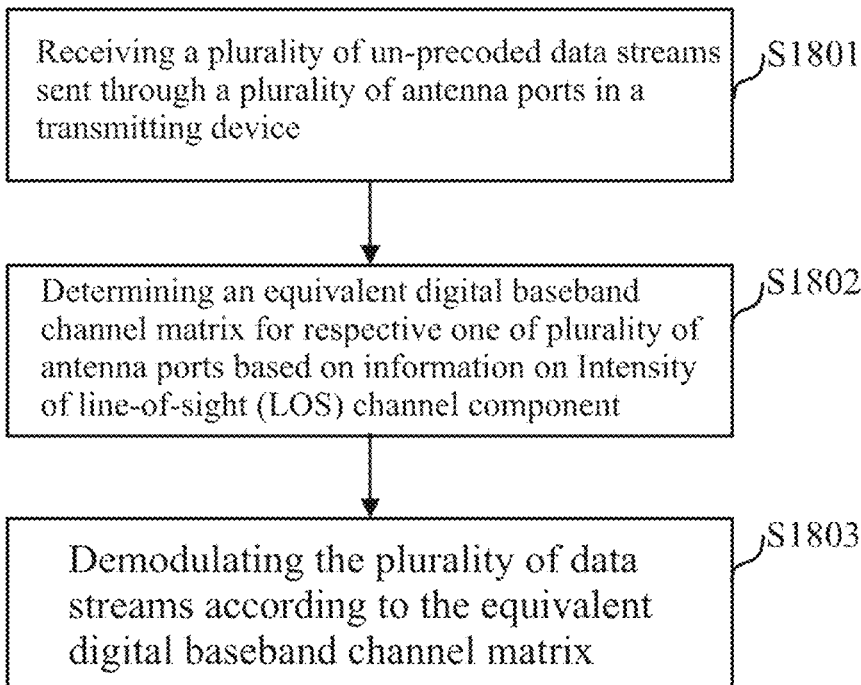
FIG. 18 is a flowchart of a method performed by a receiving device according to an embodiment of the present disclosure.
Figure 19:
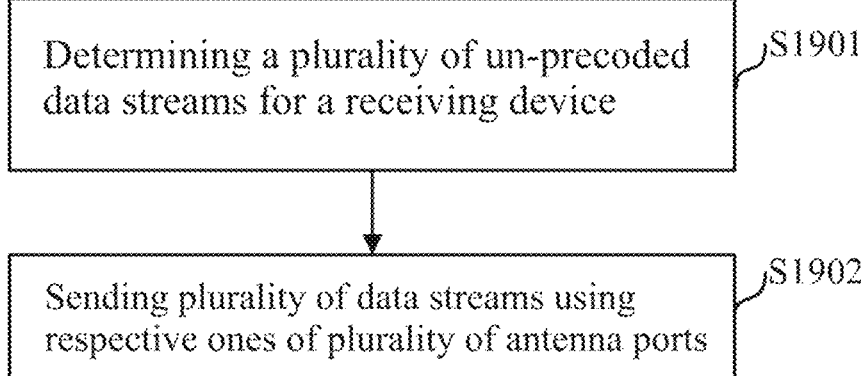
FIG. 19 is a flowchart of a method performed by a transmitting device according to an embodiment of the present disclosure.

Next, another method performed by a receiving device or a transmitting device of an embodiment of the present disclosure will be described. FIG. 18 is a flowchart of a method 1800 performed by a receiving device according to an embodiment of the present disclosure. FIG. 19 is a flowchart of a method 1900 performed by a transmitting device according to an embodiment of the present disclosure. Since the steps of the method 1800 correspond to the operations of the receiving device 1100 described above with reference to FIGS. 8-11, and the steps of the method 1900 correspond to the operations of the transmitting device 1000 described above with reference to FIGS. 8-11, a detailed description of the same content is omitted here for the sake of simplicity. The method 1800 may be performed by, for example, the receiving device shown in FIG. 11. The method 1900 may be performed by, for example, the transmitting device shown in FIG. 10.

As shown in FIG. 18, in step S1801, the receiving device 1100 receives multiple un-precoded data streams sent through a plurality of antenna ports in the transmitting device.

In step S1802, an equivalent digital baseband channel matrix for the respective ones of the plurality of antenna ports is determined based on information on the intensity of a line-of-sight (LOS) channel component. For example, the information about the intensity of the LOS channel component may be a K factor representing a ratio of the intensity of the LOS channel component to the intensity of the non-line-of-sight (LOS) channel component. In addition, the information about the intensity of the LOS channel component may also be other information indicating whether LOS path exists or is relatively strong or weak.

According to an example of the present disclosure, in step S1802, an equivalent digital baseband channel matrix for the respective ones of the plurality of antenna ports may be determined according to a result of channel estimation. According to yet another example of the present disclosure, an equivalent digital baseband channel matrix for the respective ones of the plurality of antenna ports may be determined according to the state information of the transmitting device, at least one of the position information and attitude information of the receiving device, and the information about the intensity of the line-of-sight (LOS) channel component.

In step S1803, the multiple data streams are demodulated according to the equivalent digital baseband channel matrix. For example, minimum mean square error demodulation or matched filtering demodulation may be performed on these data streams. According to an example of the present disclosure, since the transmitting device corresponding to the receiving device does not precode the data streams, the receiving device may not send a precoding matrix indicator (PMI) to the transmitting device. In this case, the transceiving unit may send at least one of channel state information reference signal resource indicator, rank indicator and channel quality indicator to the transmitting device, to report the channel state.

As shown in FIG. 19, in step S1901, the transmitting device 1000 determines multiple un-precoded data streams for the receiving device. For example, the transmitting device includes a plurality of antenna ports.

In step S1902, the transmitting device 1000 sends multiple data streams using the respective ones of the plurality of antenna ports. In some examples, the plurality of antenna ports send the data streams using the same modulation and coding strategy and using the same transmit power.

In this example, information transmission can be implemented between the transmitting device and the receiving device without precoding, and the inter-stream interference of the LOS channel is effectively eliminated, improving the performance of multi-stream transmission of the LOS channel, and expanding the capacity of the LOS MIMO channel. According to the above-described receiving device, the data streams sent through the plurality of antenna ports therein that it receives may be un-precoded data streams or reference signals, so that the transmitting device can determine the data streams to be sent by the respective antenna ports without relying on CSIT (Channel State Information at the transmitter). Therefore, the complexity of the transceiver of the transmitting device is reduced, reducing the channel estimation and feedback overhead, and improving the channel utilization rate. At the same time, the operational complexity of MIMO detection at the receiving device is correspondingly reduced.

Figure 20:
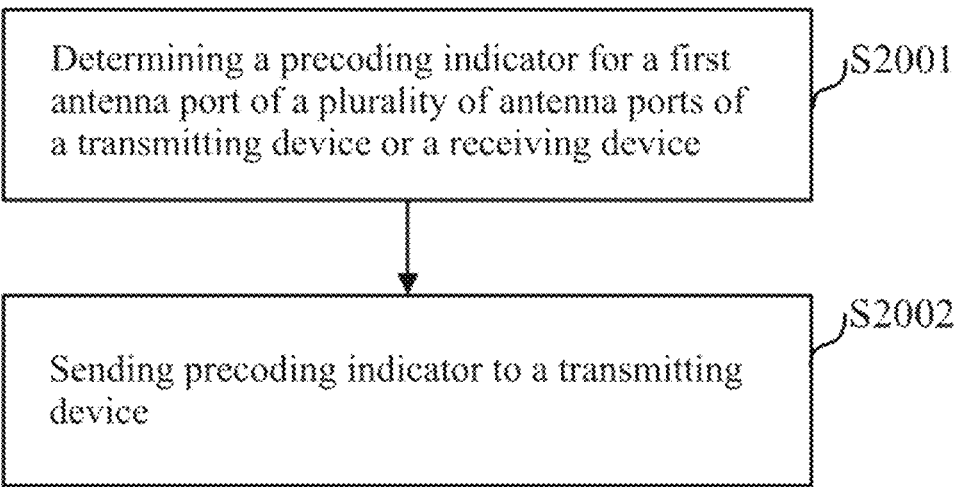
FIG. 20 is a flowchart of a method performed by a receiving device according to an embodiment of the present disclosure.
Figure 21:
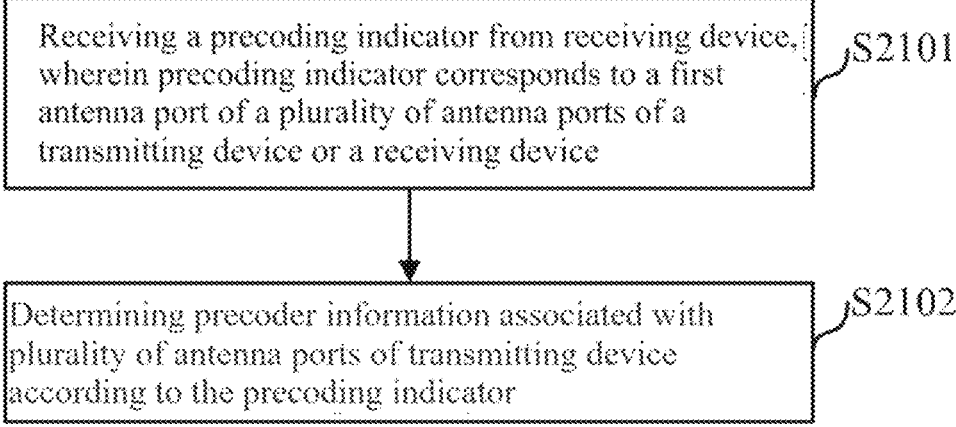
FIG. 21 is a flowchart of a method performed by a transmitting device according to an embodiment of the present disclosure.

Next, yet another method performed by a receiving device or a transmitting device of an embodiment of the present disclosure will be described. FIG. 20 is a flowchart of a method 2000 performed by a receiving device according to an embodiment of the present disclosure. FIG. 21 is a flowchart of method 2100 performed by a transmitting device according to an embodiment of the present disclosure. Since the steps of the method 2000 correspond to the operations of the receiving device 1200 described above with reference to FIGS. 12-15, and the steps of the method 2100 correspond to the operations of the transmitting device 1300 described above with reference to FIGS. 12-15, a detailed description of the same content is omitted here for the sake of simplicity. Method 2000 may be performed by, for example, the receiving device shown in FIG. 12. Method 2100 may be performed by, for example, the transmitting device shown in FIG. 13.

As shown in FIG. 20, in step S2001, the receiving device 1200 is configured to send a precoding indicator of a first antenna port of a plurality of antenna ports of the transmitting device or the receiving device. For example, the precoding indicator includes phase deflection information associated with the first antenna port.

In step S2002, the precoding indicator is sent to the transmitting device.

According to an example of the present disclosure, the receiving device 1200 may also send at least one of channel state information reference signal resource indicator (CRI), rank indicator (RI) and channel quality information (CQI) to the transmitting device.

According to an example of the present disclosure, the receiving device 1200 may also receive multiple data streams sent by the respective ones of the plurality of antenna ports, in which the control unit is further configured to independently demodulate the multiple data streams sent by the respective antenna ports.

As shown in FIG. 21, in step S2101, the transmitting device 1300 receives a precoding indicator from the receiving device, in which the precoding indicator corresponds to a first antenna port of a plurality of antenna ports of the transmitting device or the receiving device. For example, the transmitting device 1300 includes a plurality of antenna ports.

In step S2102, the transmitting device 1300 determines precoder information associated with the plurality of antenna ports of the transmitting device according to the precoding indicator. Optionally, the transmitting device 1300 may also determine the precoder information associated with the plurality of antenna ports of the transmitting device according to the precoding indicator and a DFT vector.

According to an example of the present disclosure, method 2100 may further include using the respective antenna ports of the transmitting device to send the data streams precoded according to precoder information corresponding to the antenna port, respectively. For example, the respective ones of the plurality of antenna ports of the transmitting device may send multiple data streams with the same power, using the same modulation and coding scheme (MCS).

Therefore, in an example of the present disclosure, the transmitting device 1300 and the receiving device 1200 can eliminate the inter-stream interference of the LOS channel just by using a simple precoding scheme, thereby realizing the multi-stream transmission of the LOS channel and expanding the capacity of the LOS MIMO channel. Furthermore, as described above, in the case where the PMI is acquired, the transmitting device can calculate the precoding matrix without relying on CSIT (Channel State Information at the Transmitter). Therefore, the complexity of the transceiver of the transmitting device is reduced, reducing the channel estimation and feedback overhead, and improving the channel utilization rate. The receiving device can independently demodulate the data streams sent by the respective antenna ports without MIMO detection, reducing the complexity of the transceiver of the receiving device and improving the receiving performance of the receiving device.

<Hardware Structure>

Additionally, the block diagrams used in the illustration of the above implementations show blocks in units of functions. Such functional blocks (structural units) are implemented by any combination of hardware and/or software. In addition, the implementing means for respective functional blocks are not particularly limited. That is, respective functional blocks can be implemented by one physically and/or logically combined equipment, or can be implemented by directly and/or indirectly connecting (e.g., by wire and/or wireless) two or more pieces of equipment that are physically and/or logically separated.

Figure 22:
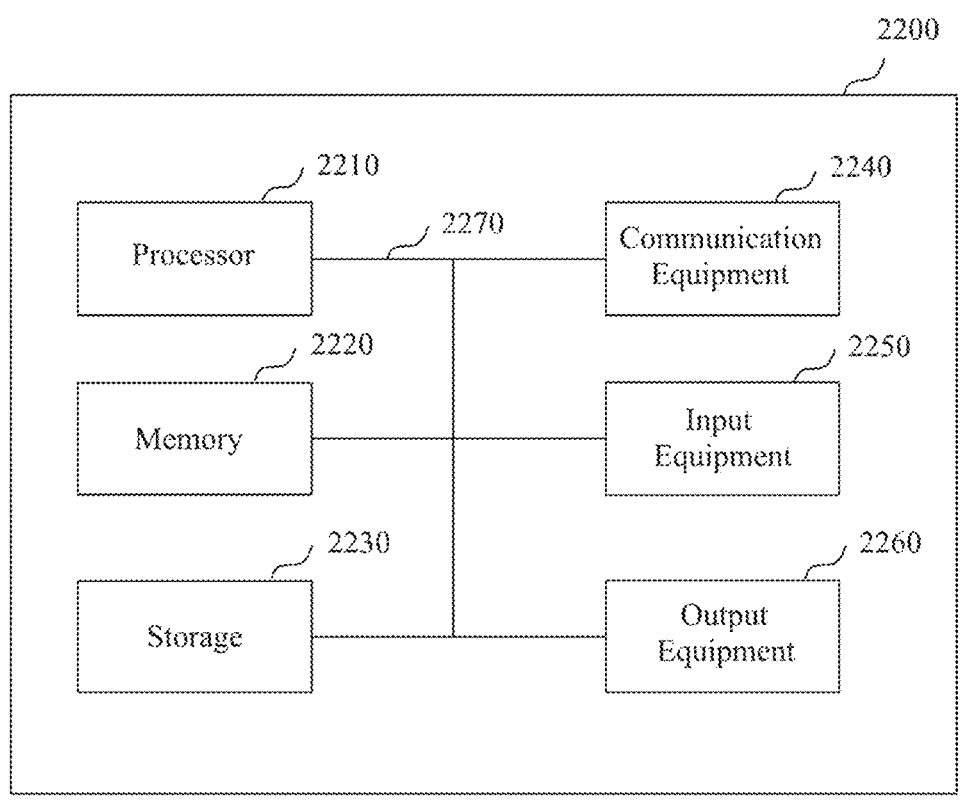
FIG. 22 is a schematic diagram of a hardware structure of a device 2200 (electronic device) according to an embodiment of the present disclosure.

For example, an electronic device according to an embodiment of the present disclosure can function as a computer performing the processing of the information sending method of the present disclosure. FIG. 22 is a schematic diagram of a hardware structure of an involved device 2200 (electronic device) according to an embodiment of the present disclosure. The above device 2200 (e.g., the transmitting device or receiving device according to the embodiments of the present disclosure) can be composed as a computer device that physically includes a processor 2210, a memory 2220, a storage 2230, a communication equipment 2240, an input equipment 2250, an output equipment 2260, a bus 2270, etc.

Additionally, in the following illustration, words such as "equipment" can be replaced by circuit, device, unit, etc. The hardware structure of the electronic device may include respective types of equipment shown in one or more drawings, or may not include some of the types of equipment.

For example, only one processor 2210 is illustrated, but there may be multiple processors. In addition, the processing may be performed by one processor, or by more than one processor concurrently, sequentially, or by other methods. Additionally, the processor 2210 may be installed by means of more than one chip.

For example, respective functions of the device 2200 are implemented by: reading a specified software (program) onto hardware such as the processor 2210, the memory 2220, and the like, so that the processor 2210 performs operations, controls communication by the communication equipment 2240, and controls reading and/or writing of data in the memory 2220 and the storage 2230.

For example, the processor 2210 drives an operating system to operate to control the computer as a whole. The processor 2210 may be composed of a Central Processing Unit (CPU) including interfaces with peripheral equipment, control equipment, arithmetic equipment, register, etc. For example, such control units described above can be implemented by the processor 2210.

In addition, the processor 2210 reads out programs (program codes), software modules, data, and/or the like from the storage 2230 and/or the communication equipment 2240 to the memory 2220, and performs various processing according to them. As a program, a program that causes the computer to execute at least a part of the actions illustrated in the above-described implementations can be adopted. For example, the processing unit of the first network element can be implemented by a control program saved in the memory 2220 and operated by the processor 2210, and other functional blocks can be implemented in the same way.

The memory 2220 is a computer-readable recording medium, which can be composed of at least one of, for example, a Read Only Memory (ROM), an Erasable Programmable ROM (EPROM), an Electrically EPROM (EEPROM), a Random Access Memory (RAM), and other appropriate storage media. The memory 2220 can also be referred to as a register, a cache, a main memory (main storage), etc. The memory 2220 may save executable programs (program codes), software modules, and/or the like for implementing the method involved in an implementation of the present disclosure.

The storage 2230 is a computer-readable recording medium, which can be composed of, for example, a flexible disk, a floppy disk, a magneto-optical disk (e.g., a compact disc ROM (CD-ROM), etc.), a digital versatile disc, a Blu-ray® disc, a removable disk, a hard disk drive, a smart card, a flash memory device (e.g., a card, a stick, a key driver), a magnetic stripe, a database, a server, and other appropriate storage media. The storage 2230 can also be referred to as secondary storage.

Communication Equipment 2240 is a hardware (sending and receiving equipment) for communication between computers through wired and/or wireless networks, which is also referred to as, for example, a network device, a network controller, a network card, a communication module, etc. In order to implement, for example, Frequency Division Duplex (FDD) and/or Time Division Duplex (TDD), the communication equipment 2240 may include a high-frequency switch, a duplexer, a filter, a frequency synthesizer etc. For example, the above-described transceiving unit, transmitting unit, receiving unit, and/or the like can be implemented by the communication equipment 2240.

The input equipment 2250 is an input device (e.g., a keyboard, a mouse, a microphone, a switch, a button, a sensor, etc.) that accepts input from the outside. The output equipment 2260 is an output device (e.g., a display, a speaker, a Light Emitting Diode (LED) lamp, etc.) that realizes output to the outside. Additionally, the input equipment 2250 and the output equipment 2260 may also be an integrated structure (e.g., a touch panel).

In addition, respective pieces of equipment such as the processor 2210, the memory 2220 and/or the like are connected through the bus 2270 for communicating information. The bus 2270 may be composed of either a single bus, or different buses among equipments.

In addition, the electronic device may include a hardware such as a microprocessor, a Digital Signal Processor (DSP), an application specific integrated circuit (ASIC), a Programmable Logic Device (PLD), a Field Programmable Gate Array (FPGA) and/or the like, by which part or all of respective functional blocks can be implemented. For example, the processor 2210 may be installed by means of at least one piece of such hardware.

(Variation)

Additionally, terms illustrated in the specification and/or terms required to understand the specification can be interchanged with terms with same or similar meanings. For example, a channel and/or symbol can also be a signal (signaling). In addition, a signal can also be a message. A reference signal can also be referred to as a Reference Signal (RS) for short, or can also be referred to as a Pilot, a pilot signal, and/or the like according to the applied standard. In addition, a Component Carrier (CC) can also be referred to as a cell, a frequency carrier, a carrier frequency, etc.

In addition, information, parameter, and/or the like illustrated in the specification can be expressed by an absolute value, or by a relative value with respect to a specified value, or by other corresponding information. For example, a radio resource can be indicated by a specified index. Further, a formula and/or the like using such parameters can be different from that explicitly disclosed in the specification.

Names used for parameters and/or the like in the specification are not restrictive in any aspect. For example, various channels (Physical Uplink Control Channel (PUCCH), Physical Downlink Control Channel (PDCCH), etc.) and information units can be identified by any appropriate names, thus these various names allocated to these various channels and information units are not restrictive in any aspect.

Information, signals, and/or the like illustrated in the specification can be expressed by any of a wide variety of different technologies. For example, data, command, instruction, information, signals, bits, symbols, chips, and/or the like that might be mentioned in all the above illustrations can be expressed by voltages, currents electromagnetic waves, magnetic fields or particles, optical fields or photons, or any combination thereof.

In addition, information, signals, and/or the like may be output from the upper layer to the lower layer and/or from the lower layer to the upper layer. Information, signals, and/or the like may be input or output via multiple network nodes.

The input or output information, signals, and/or the like may be saved in a specific place (e.g., memory) or managed by a management table. The input or output information, signals, and/or the like may be overwritten, updated or supplemented. The output information, signals, and/or the like may be deleted. The input information, signals, and/or the like may be sent to other equipments.

The notification of information is not limited to the approaches/implementations illustrated in the specification, but can also be performed by other methods. For example, the notification of information can be implemented by physical layer signaling (e.g., Downlink Control Information (DCI), Uplink Control Information (UCI)), upper layer signaling (e.g., Radio Resource Control (RRC) signaling, broadcast information (Master Information Block (MIB), System Information Block (SIB), etc.), Medium Access Control (MAC) signaling), other signals, or combinations thereof.

Additionally, physical layer signaling can also be referred to as L1/L2 (Layer 1/Layer 2) control information (L1/L2 control signal), L1 control information (L1 control signal) and so on. In addition, RRC signaling can also be referred to as RRC message, such as RRC Connection Setup message, RRC Connection Reconfiguration message, etc. Furthermore, the MAC signaling may be notified by a MAC Control Element (MAC CE), for example.

In addition, the notification of specified information (e.g., notification of "X") is not limited to being performed explicitly, but can also be performed implicitly (e.g., by not notifying the specified information, or by notifying other information).

Determinations can be performed by means of a value (0 or 1) represented by one bit, or by means of a Boolean value represented by true or false, or by means of a numerical comparison (e.g., comparison with a specified value).

Software, whether being referred to as software, firmware, middleware, microcode, hardware description language or some other name, should be broadly interpreted as referring to commands, command sets, codes, code segments, program codes, programs, subroutines, software modules, application programs, software application programs, software packages, routines, subroutines, objects, executable files, execution threads, steps, functions, etc.

In addition, software, commands, information, and/or the like can be sent or received via transmission medium. For example, when software is sent from websites, servers, or some other remote resources using wired technologies (co-axial cable, optical cable, twisted pair, Digital Subscriber Line (DSL), etc.) and/or wireless technologies (infrared, microwave, etc.), such wired technologies and/or wireless technologies are included in the definition of transmission medium.

Terms such as "system" and "network" used in the specification can be used interchangeably.

In the specification, terms such as Base Station (BS), wireless base station, eNB, gNB, cell, sector, cell group, carrier and component carrier can be used interchangeably. A base station is sometimes referred to as a fixed station, a NodeB, an eNB, an access point, a sending point, a receiving point, a femtocell, a small cell, etc.

A base station can accommodate one or more (e.g., three) cells (also referred to as sectors). When a base station accommodates multiple cells, the entire coverage area of the base station can be divided into multiple smaller areas, each of which can also provide communication services through a base station subsystem (e.g., an indoor small base station (Remote Radio Head, RRH)). A term such as "cell" or "sector" refers to a part or the whole of the coverage area of the base station and/or base station subsystem that provides communication services in the coverage.

In the specification, terms such as "MS (Mobile Station)", "terminal device (user terminal)", "UE (User Equipment)" and "terminal" can be used interchangeably. A mobile station is sometimes referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate term.

In addition, wireless base station in the specification can also be replaced by terminal device. For example, the various approaches/implementations of the present disclosure can also be applied to a structure in which a communication between a wireless base station and a terminal device is replaced by a communication among multiple terminal devices (Device-to-Device, D2D). At this time, the functions embodied by the above-described electronic device can be regarded as the functions embodied by the terminal device. In addition, words such as "uplink" and "downlink" can also be replaced by "side". For example, "uplink channel" can also be replaced by "side channel".

Similarly, terminal device in the specification can also be replaced by wireless base station. At this time, the functions embodied by the terminal device can be regarded as the functions embodied by a first communication device or a second communication device.

In the specification, it is assumed that a specific action performed by a base station is sometimes performed by its upper node as appropriate. Obviously, in a network composed of one or more network nodes with a base station, a wide variety of actions performed for communications with terminals can be performed by a base station, more than one network node except for the base station (e.g., Mobility Management Entity (MME), Serving-Gateway (S-GW), and/or the like, can be taken into account, but not limited thereto), or combinations thereof.

The various approaches/implementations illustrated in the specification can be used alone or in combination, or can also be used by switching during execution. In addition, the orders in the processing steps, sequences, flowcharts, and/or the like of the various approaches/implementations illustrated in the specification can be changed as long as there is no contradiction. For example, with respect to the method illustrated in the specification, a wide variety of step units are given in an exemplary order, which are not limited to the specific order given.

The various approaches/implementations illustrated in the specification can be applied to systems and/or next-generation systems extended based thereon with Long Term Evolution (LTE), LTE-Advanced (LTE-A), LTE-Beyond (LTE-B), super 3rd generation mobile communication system (SUPER 3G), international mobile communication-Advanced (IMT-Advanced), 4th generation mobile communication system (4G), 5th generation mobile communication system (5G), Future Radio Access (FRA), New Radio Access Technology (New-RAT), New Radio (NR), New Radio Access (NX), Future generation radio access (FX), Global System for Mobile Communications (GSM®), Code Division Multiple Access 3000 (CDMA3000), Ultra Mobile Broadband (UMB), IEEE 920.11 (Wi-Fi®), IEEE 920.16

(WiMAX®), IEEE 920.20, Ultra-WideBand (UWB), Bluetooth®, other appropriate wireless communicating methods.

The recitations such as "according to" used in the specification does not mean "only according to" unless explicitly recited as such in other paragraphs. In other words, the recitations such as "according to" refers to both "only according to" and "at least according to".

Any reference to units with ordinal numerals such as "first" and "second" used in the specification does not comprehensively limit the number or order of these units. Such names can be used in the specification as a convenient way to distinguish two or more units. Therefore, the reference to a first unit and a second unit does not mean that only two units can be adopted or that the first unit must precede the second unit in some way.

Terms such as "judging (determining)" used in the specification sometimes includes various actions. For example, "judging (determining)" can refer to calculating, computing, processing, deriving, investigating, looking up (e.g., searching in a table, a database or some other data structure), ascertaining, etc. In addition, "judging (determining)" can also refer to receiving (e.g., receiving information), transmitting (e.g., transmitting information), input, output, accessing (e.g., accessing data in memory), etc. In addition, "judging (determining)" can also refer to resolving, selecting, choosing, establishing, comparing, etc. That is, "judging (determining)" can refer to several actions.

Terms such as "connected" and "coupled" used in the specification or any variation thereof refer to any direct or indirect connection or combination among two or more units, which may include a case in which there are one or more intermediate unit between two units that are "connected" or "combined" with each other. The combination or connection among units can be physical, logical or a combination of both. For example, "connected" can also be replaced by "accessed". As used in the specification, it can be considered that two units are "connected" or "combined" with each other by using one or more wires, cables, and/or printed electrical connections, and as some non-restrictive and non-exhaustive examples, by using electromagnetic energy with a wavelength of a radio frequency region, a microwave region, and/or a light (both visible and invisible) region, etc.

As used in the specification or claims, terms such as "including", "comprising" and variations thereof, as well as the term "having", are equally open. Further, the term "or" used in the specification or claims is not exclusive-or.

The present disclosure has been described in detail above, but it is obvious to those skilled in the art that the present disclosure is not limited to the implementations illustrated in the specification. The present disclosure can be implemented as modification and alteration thereto without departing from the purpose and scope of the present disclosure determined by the recitations of the claims. Therefore, the recitations of the specification is for the purpose of illustration and does not have any restrictive significance to the present disclosure.

The invention claimed is:

1. A transmitting device, comprising:
   a transceiving unit, including a first antenna array, wherein the first antenna array includes a plurality of first sub-arrays;
   a control unit, configured to:
      obtain information on the intensity of a line-of-sight (LOS) channel component in a communication channel,
      determine whether a distance between the receiving device and the transmitting device satisfies a distance condition, and
      configure the emitting sub-arrays of the plurality of first sub-arrays according to the information on the intensity of the LOS channel component in the communication channel or the distance between the receiving device and the transmitting device,
      wherein the distance condition is determined according to at least one of position information and attitude information of the receiving device.

2. The transmitting device according to claim 1, wherein the transceiving unit further includes a feeding module, the feeding module includes a plurality of feeding sub-modules respectively corresponding to the plurality of first sub-arrays, the control unit configures the first antenna array through the feeding module according to at least one of position information and attitude information of the receiving device, when it is determined that the communication channel satisfies a predetermined channel condition according to the information on the intensity of the LOS channel component in the communication channel.

3. The transmitting device according to claim 1, wherein the control unit configures the emitting sub-arrays of the plurality of first sub-arrays at least partially according to the position information and attitude information of the receiving device.

4. The transmitting device according to claim 3, wherein the control unit configures the beams emitted by the emitting sub-arrays of the plurality of first sub-arrays according to the position information and attitude information of the receiving device.

5. The transmitting device according to claim 1, wherein the control unit is further configured to beam-shape the beams emitted by the first antenna array.

* * * * *